United States Patent
Warashina et al.

(10) Patent No.: US 9,372,285 B2
(45) Date of Patent: Jun. 21, 2016

(54) PRODUCTION METHOD FOR OPTICAL COMPONENT AND OPTICAL COMPONENT

(75) Inventors: Yoshihisa Warashina, Hamamatsu (JP); Tomofumi Suzuki, Hamamatsu (JP); Kohei Kasamori, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 87 days.

(21) Appl. No.: 14/117,089

(22) PCT Filed: Apr. 4, 2012

(86) PCT No.: PCT/JP2012/059229
§ 371 (c)(1),
(2), (4) Date: Nov. 12, 2013

(87) PCT Pub. No.: WO2012/157358
PCT Pub. Date: Nov. 22, 2012

(65) Prior Publication Data
US 2014/0104687 A1    Apr. 17, 2014

(30) Foreign Application Priority Data

May 16, 2011    (JP) ................................ 2011-109689

(51) Int. Cl.
*G02B 1/10* (2015.01)
*G02B 1/115* (2015.01)
*G01B 9/02* (2006.01)
*G01J 3/453* (2006.01)
*G02B 26/06* (2006.01)
G02B 26/08 (2006.01)

(52) U.S. Cl.
CPC ............ *G02B 1/115* (2013.01); *G01B 9/02051* (2013.01); *G01B 9/02056* (2013.01); *G01J 3/4535* (2013.01); *G02B 26/06* (2013.01); *G02B 26/0841* (2013.01)

(58) Field of Classification Search
CPC ............ G02B 1/10; G02B 1/11; G02B 1/113; G02B 1/115; G02B 1/116; G02B 26/06; G02B 26/0841; G01J 3/4535
USPC ......... 359/577, 580, 581, 582, 588, 590, 887, 359/888
See application file for complete search history.

(56) References Cited

U.S. PATENT DOCUMENTS

| 2001/0009809 A1* | 7/2001 | Miwa ................ H01L 21/76224 438/689 |
| 2009/0140261 A1* | 6/2009 | Saeki ................ H01L 27/14609 257/72 |
| 2010/0039707 A1* | 2/2010 | Akahane et al. .............. 359/576 |

FOREIGN PATENT DOCUMENTS

| CN | 101786592 | 7/2010 |
| JP | 2002-267837 A | 9/2002 |

(Continued)

*Primary Examiner* — Bumsuk Won
*Assistant Examiner* — William R Alexander
(74) *Attorney, Agent, or Firm* — Drinker Biddle & Reath LLP

(57) ABSTRACT

A method for manufacturing a light transmissive optical component, includes a first etching process of forming a depressed portion by applying etching to a silicon region of a plate-shaped member, a thermal oxidation process of forming a silicon oxide film by thermally oxidizing an inner side surface of the depressed portion, and a nitride film formation process of forming a silicon nitride film that covers the silicon oxide film. Accordingly, it is possible to realize a manufacturing method for an optical component which is capable of uniformly forming a silicon oxide film on a semi-transmissive reflecting surface which is largely inclined (or nearly vertical) with respect to a substrate surface, and an optical component produced by this method.

8 Claims, 29 Drawing Sheets

(56) References Cited

FOREIGN PATENT DOCUMENTS

| JP | 2007-284791 A | 11/2007 |
| JP | 2008-102132 A | 5/2008 |
| JP | 2010-170029 A | 8/2010 |

* cited by examiner

Fig.8
(a)
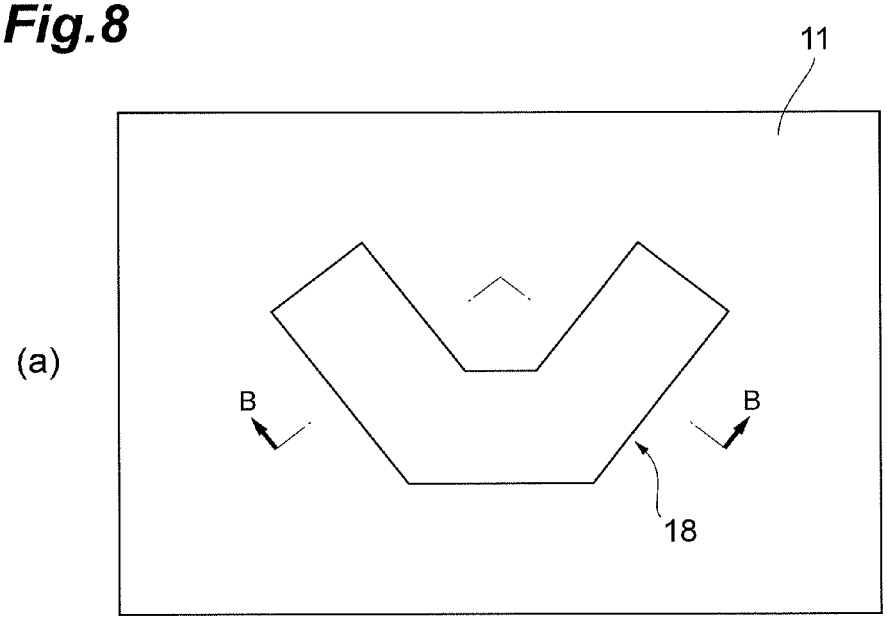
(b)
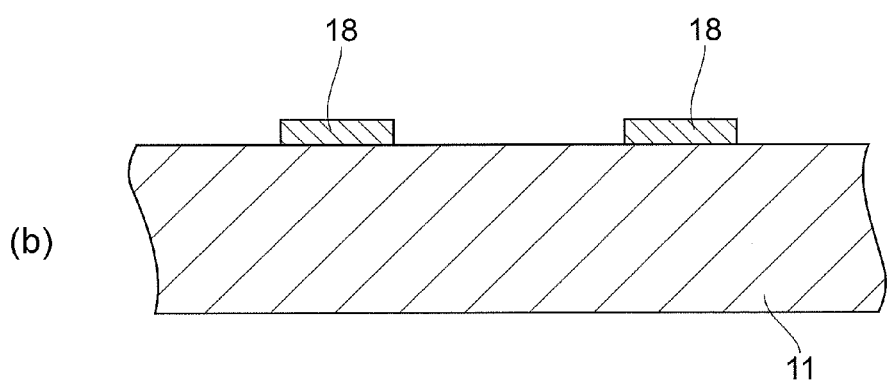

Fig.9
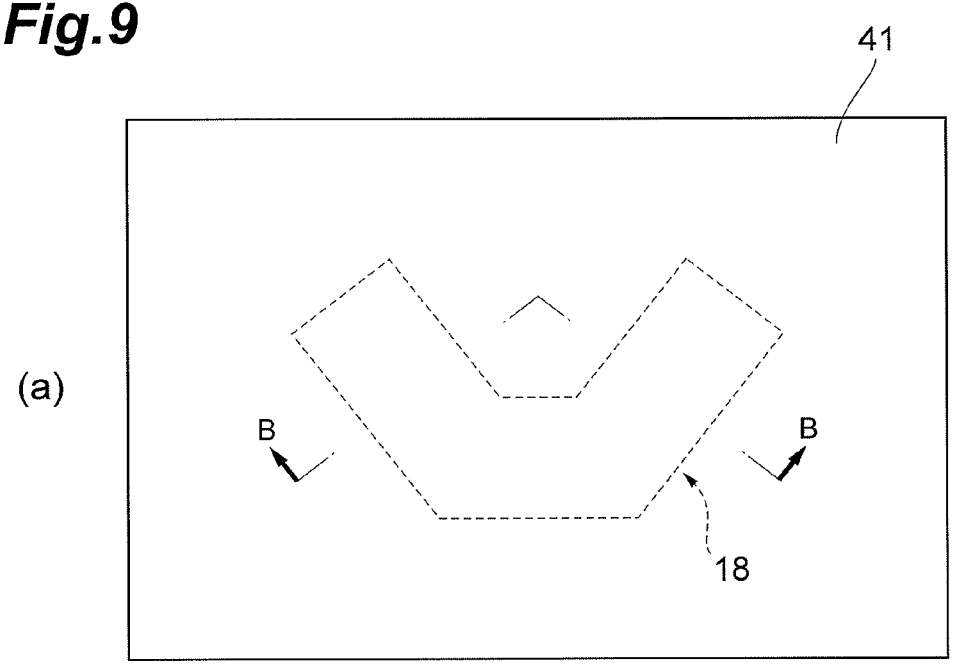
(a)
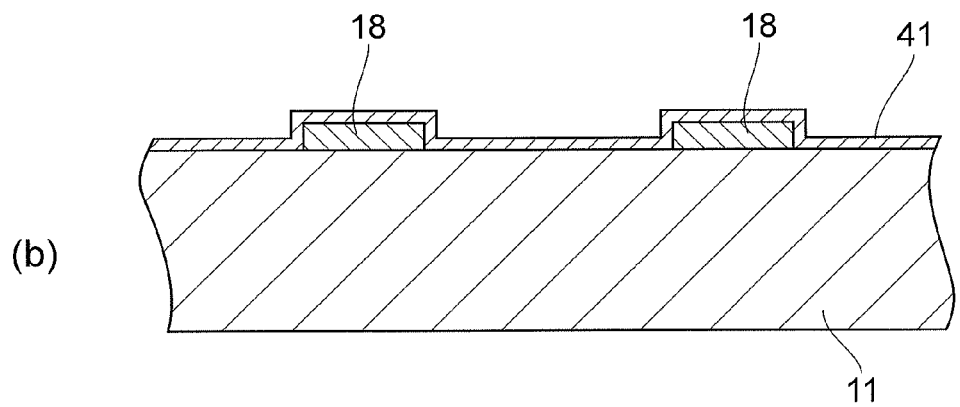
(b)

Fig.10
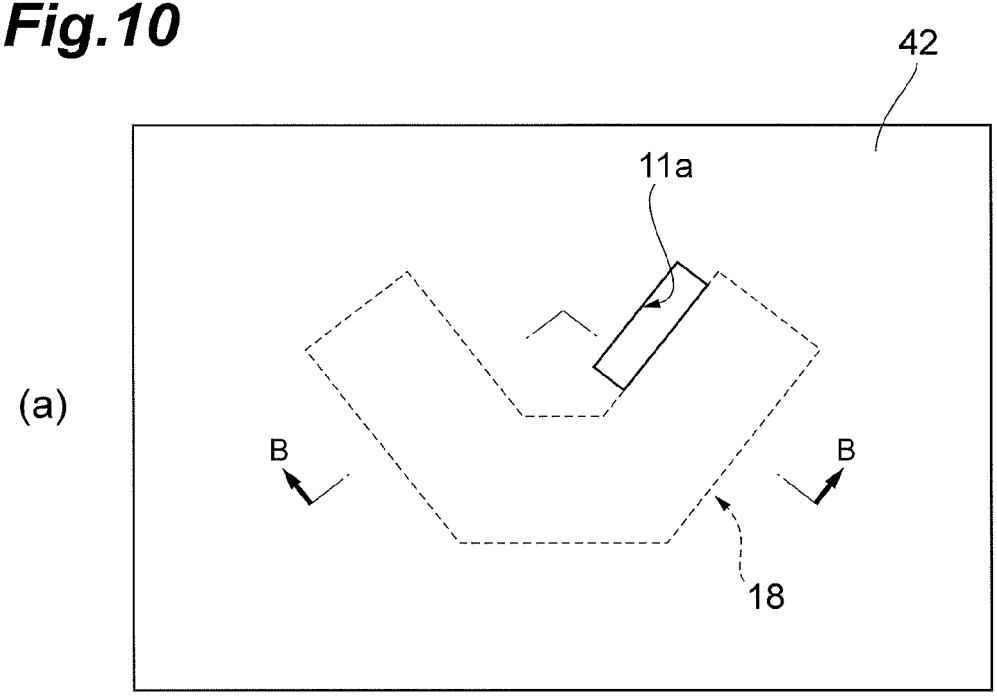
(a)
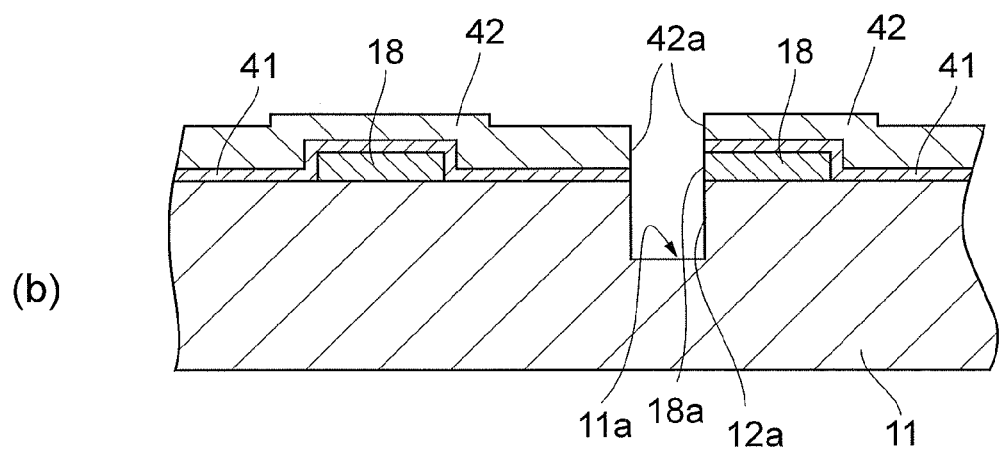
(b)

*Fig.11*
(a)
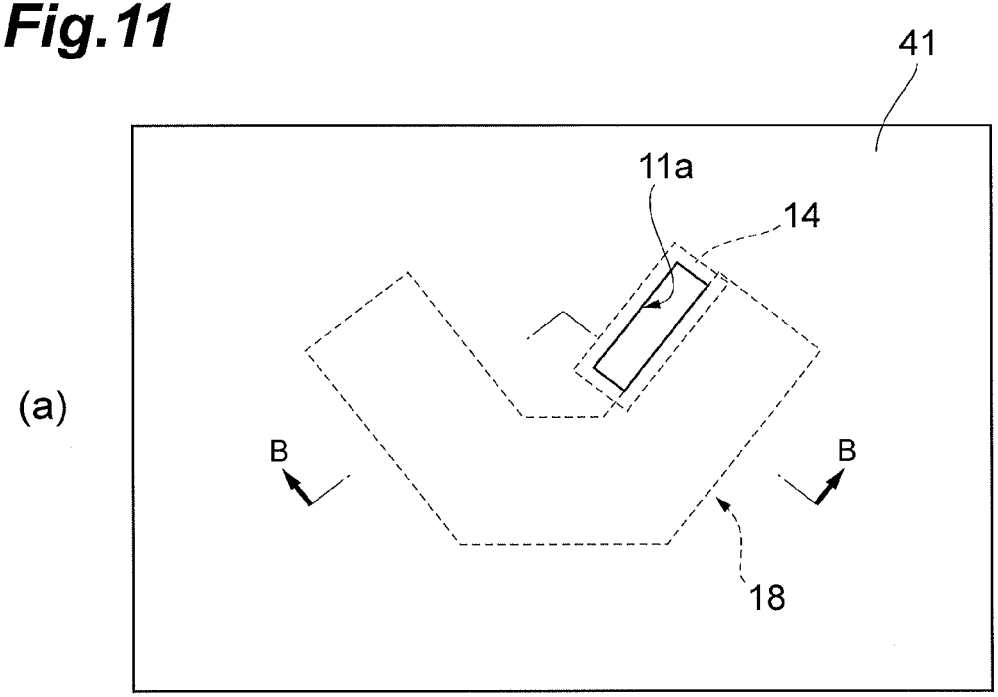
(b)
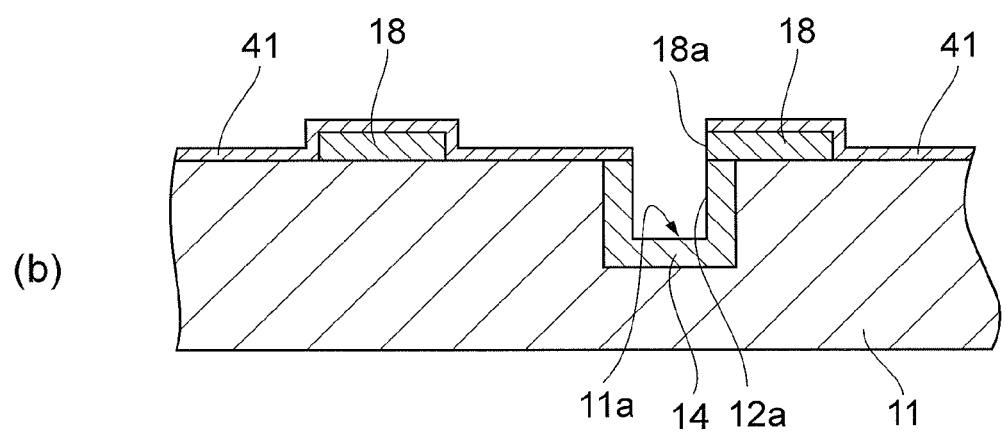

Fig.12
(a) 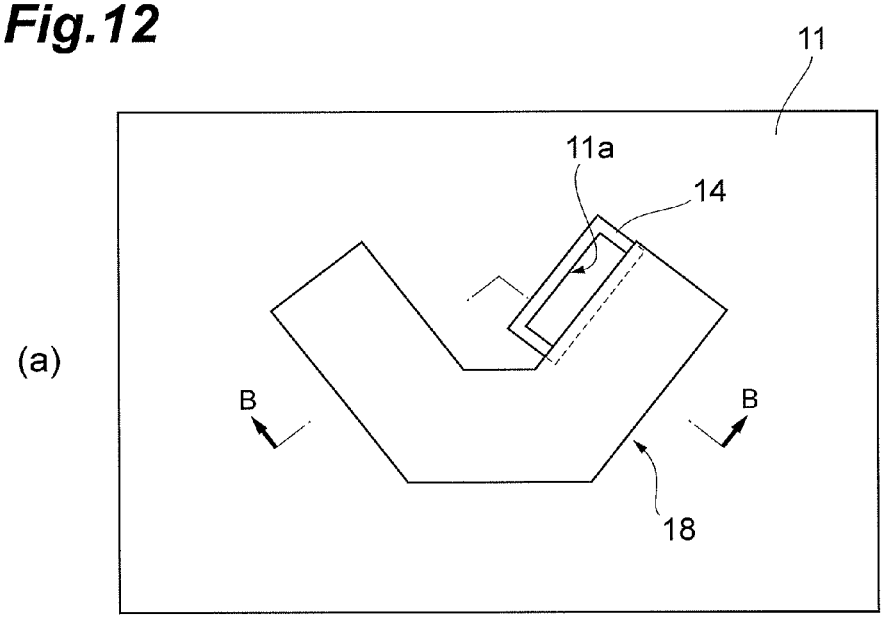
(b) 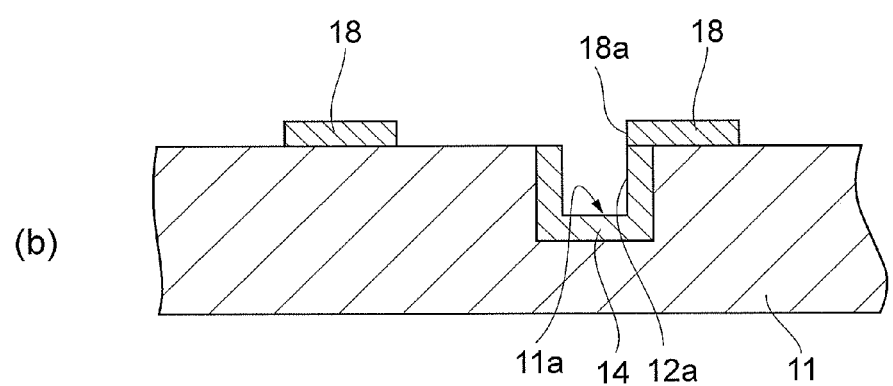

Fig.13
(a)
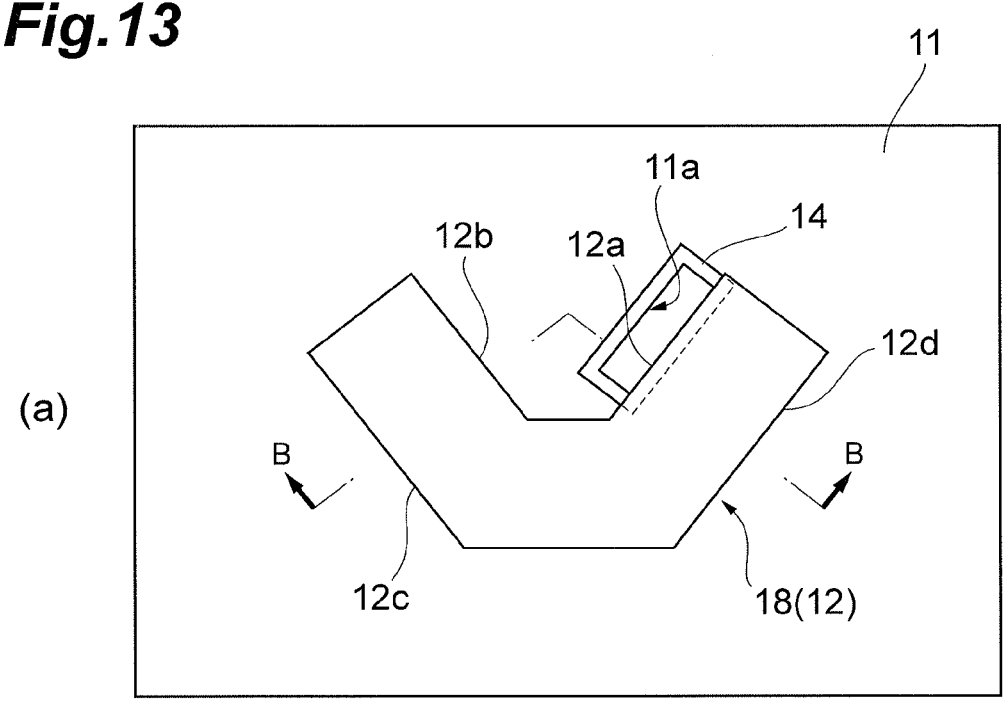
(b)
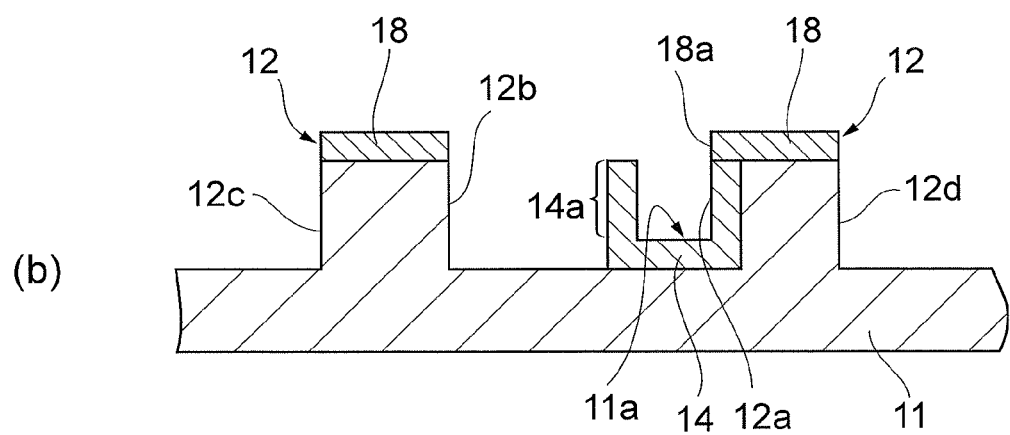

Fig.14
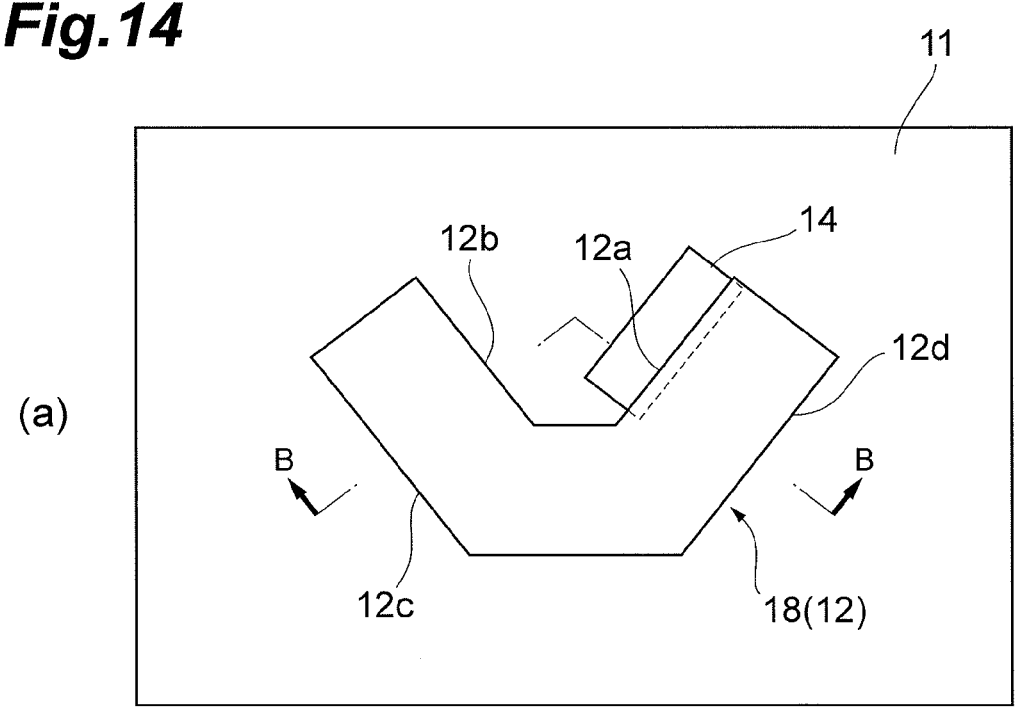
(a)
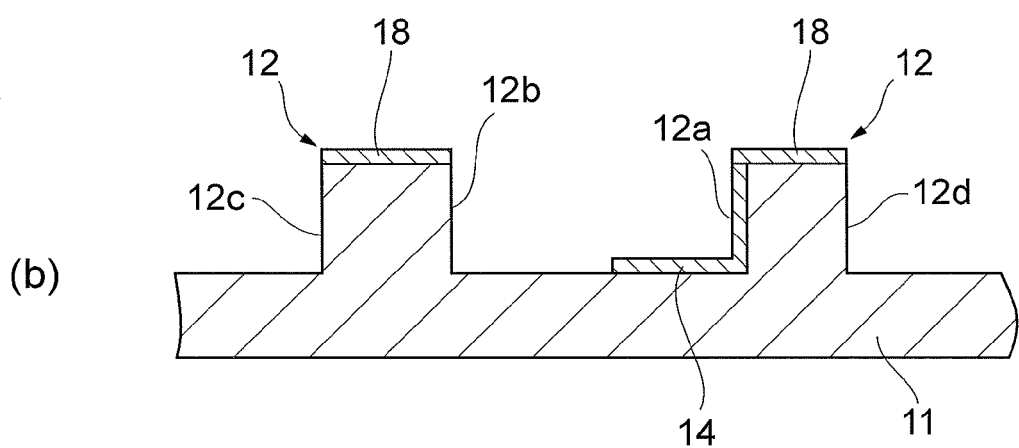
(b)

*Fig.15*
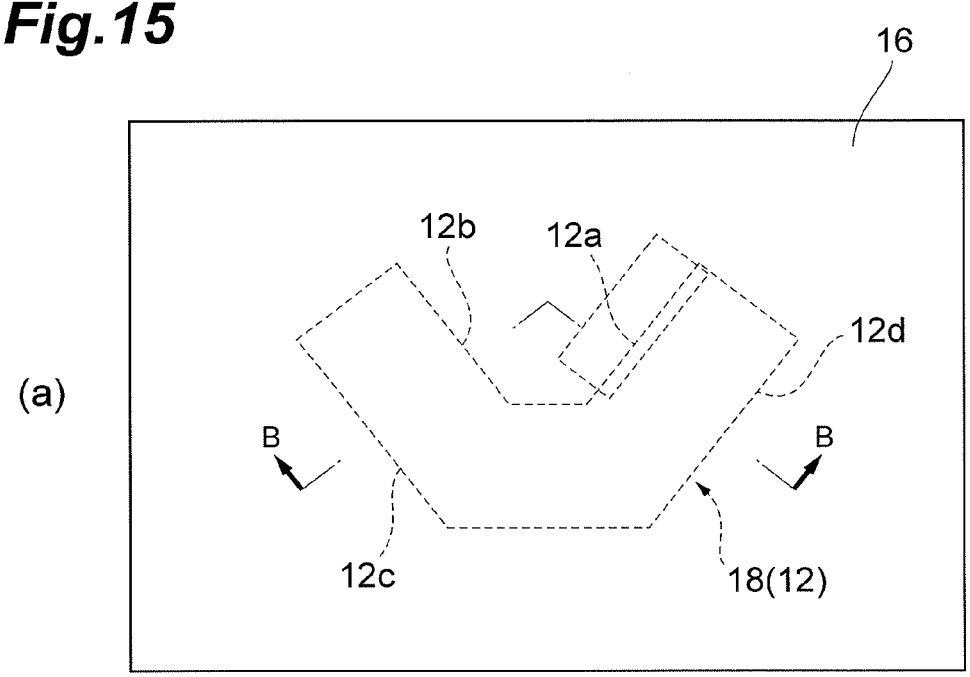
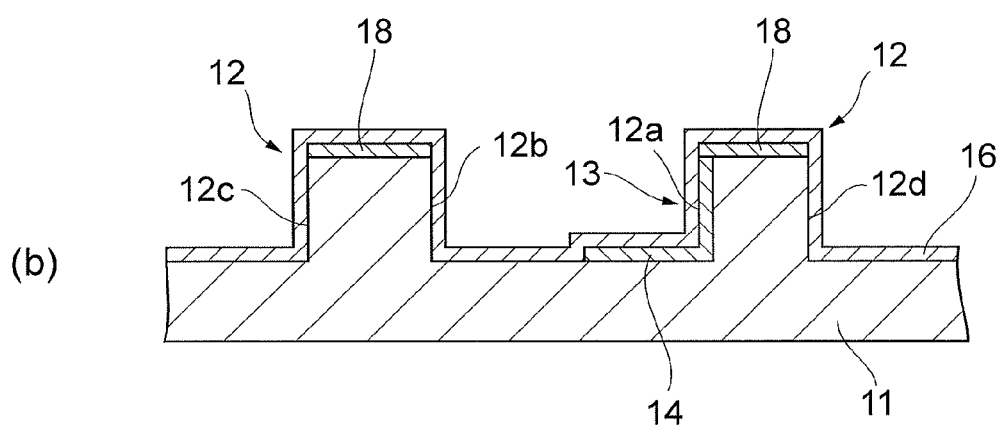

PRODUCTION METHOD FOR OPTICAL COMPONENT AND OPTICAL COMPONENT

TECHNICAL FIELD

The present invention relates to a manufacturing method for an optical component and an optical component.

BACKGROUND ART

In Patent Documents 1 and 2, there is disclosed an optical module in which an interference optical system is configured on an SOI (Silicon On Insulator) substrate by use of a MEMS technology. These interference optical systems include a beam splitter, a movable mirror attached to an electrostatic actuator, and a fixed mirror, and these are formed by applying etching to a silicon layer and an insulating layer of an SOI substrate into arbitrary shapes.

CITATION LIST

Patent Literature

Patent Document 1: Japanese Patent Application Laid-Open No. 2008-102132
Patent Document 2: Japanese Patent Application Laid-Open No. 2010-170029

SUMMARY OF INVENTION

Technical Problem

In an optical component composing an interference optical system or the like, in some cases, a light transmitting surface or a semi-transmissive reflecting surface (half-mirror) may be formed by applying etching to a silicon substrate or a silicon layer. However, because the refractive index of silicon in a wavelength in the vicinity of, for example, 1 μm is approximately 3.5, the reflectance of Fresnel reflection on the semi-transmissive reflecting surface is approximately 30%, that is far inferior to 50% which is an ideal value in an interference optical system. Further, the transmittance of the light transmitting surface is approximately 70%, and a light loss is caused through the light transmitting surface as well. In particular, in an interference optical system, it is necessary to correct an optical path length according to a wavelength of light caused by wavelength dispersion of silicon, and an optical component for the correction is installed, and therefore, a loss through the light transmitting surface of the optical component is further added.

In order to solve the above-described problem, an antireflection film is preferably formed on the light transmitting surface, and a semi-transmissive reflection film is preferably formed on the semi-transmissive reflecting surface. The antireflection film is appropriately realized by, for example, a silicon nitride film, and it is possible to adjust the transmittance to an appropriate value in accordance with its film thickness. Further, the semi-transmissive reflection film is appropriately realized by laminating, for example, a silicon oxide film and a silicon nitride film, and it is possible to adjust the reflectance to an appropriate value in accordance with its film thickness. However, in the case where the semi-transmissive reflecting surface is largely inclined or nearly vertical to a substrate surface, it is difficult to uniformly form a silicon oxide film onto the semi-transmissive reflecting surface by CVD or the like, and a method capable of uniformly forming a silicon oxide film onto such a semi-transmissive reflecting surface is desired.

The present invention has been achieved in view of the above-described problem, and an object thereof is to provide a manufacturing method for an optical component which is capable of uniformly forming a silicon oxide film on a semi-transmissive reflecting surface which is largely inclined (or nearly vertical) with respect to a substrate surface, and an optical component manufactured by this method.

Solution to Problem

In order to solve the above-described problems, a manufacturing method for an optical component according to the present invention includes a first etching process of forming a depressed portion by applying etching to a silicon region of a plate-shaped member including the silicon region, a thermal oxidation process of forming a silicon oxide film by thermally oxidizing an inner side surface of the depressed portion, and a nitride film formation process of forming a silicon nitride film that covers the silicon oxide film.

In this manufacturing method, after the depressed portion having the inner side surface serving as a semi-transmissive reflecting surface is formed in the silicon region, this inner side surface is thermally oxidized, to form the silicon oxide film. In accordance with this method, it is possible to form the silicon oxide film on the inner side surface with a uniform thickness, differently from the case where CVD is used, even in the case where the inner side surface (semi-transmissive reflecting surface) is largely inclined (or nearly vertical) with respect to the substrate surface. Then, a silicon nitride film is formed so as to cover the silicon oxide film, thereby it is possible to appropriately form a semi-transmissive reflection film on the inner side surface.

Further, an optical component according to the present invention includes a silicon region which is included in a plate-shaped member, and whose one side surface is formed by etching, a silicon oxide film that covers the one side surface, and a silicon nitride film that covers the silicon oxide film, and the silicon oxide film is formed by thermally oxidizing an inner side surface of a depressed portion formed in the silicon region. In accordance with this optical component, it is possible to provide an optical component in which a silicon oxide film is uniformly formed on one side surface serving as a semi-transmissive reflecting surface which is largely inclined (or nearly vertical) with respect to a board surface of a plate-shaped member.

Advantageous Effects of Invention

In accordance with the manufacturing method for an optical component and the optical component of the present invention, it is possible to uniformly form a silicon oxide film on a semi-transmissive reflecting surface which is largely inclined (or nearly vertical) with respect to a substrate surface.

BRIEF DESCRIPTION OF DRAWINGS

FIG. 8 includes diagrams showing a mask formation process in a manufacturing method for the first plate-shaped member.

FIG. 9 includes diagrams showing a mask formation process in the manufacturing method for the first plate-shaped member.

FIG. 10 includes diagrams showing a first etching process in the manufacturing method for the first plate-shaped member.

FIG. 11 includes diagrams showing a thermal oxidation process in the manufacturing method for the first plate-shaped member.

FIG. 12 includes diagrams showing a nitride film removal in the thermal oxidation process in the manufacturing method for the first plate-shaped member.

FIG. 13 includes diagrams showing a second etching process in the manufacturing method for the first plate-shaped member.

FIG. 14 includes diagrams showing a third etching process in the manufacturing method for the first plate-shaped member.

FIG. 15 includes diagrams showing a nitride film formation process in the manufacturing method for the first plate-shaped member.

DESCRIPTION OF EMBODIMENTS

Hereinafter, an embodiment of a manufacturing method for an optical component and an optical component according to the present invention will be described in detail with reference to the accompanying drawings. In the description of the drawings, the same components are denoted by the same reference symbols, and overlapping descriptions will be omitted.

First, a first plate-shaped member having an optical component prepared by a manufacturing method according to an embodiment of the present invention will be described. Thereafter, a second plate-shaped member prepared separately from the first plate-shaped member will be described. In addition, the first and second plate-shaped members are joined together, to compose one optical module which has a Michelson interference optical system built-in.

Figure 1:
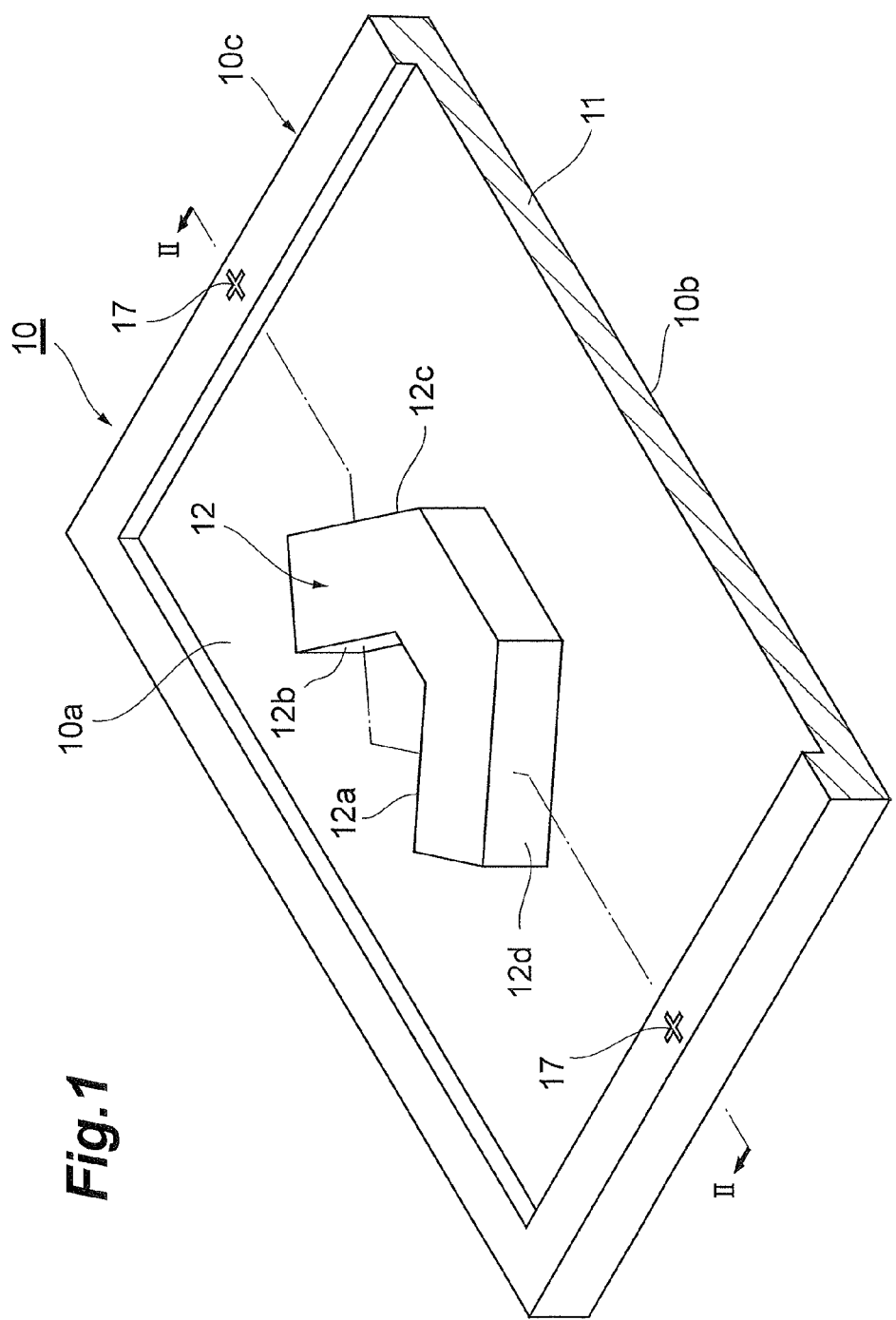
FIG. 1 is a perspective view showing an appearance of a first plate-shaped member.
Figure 2:
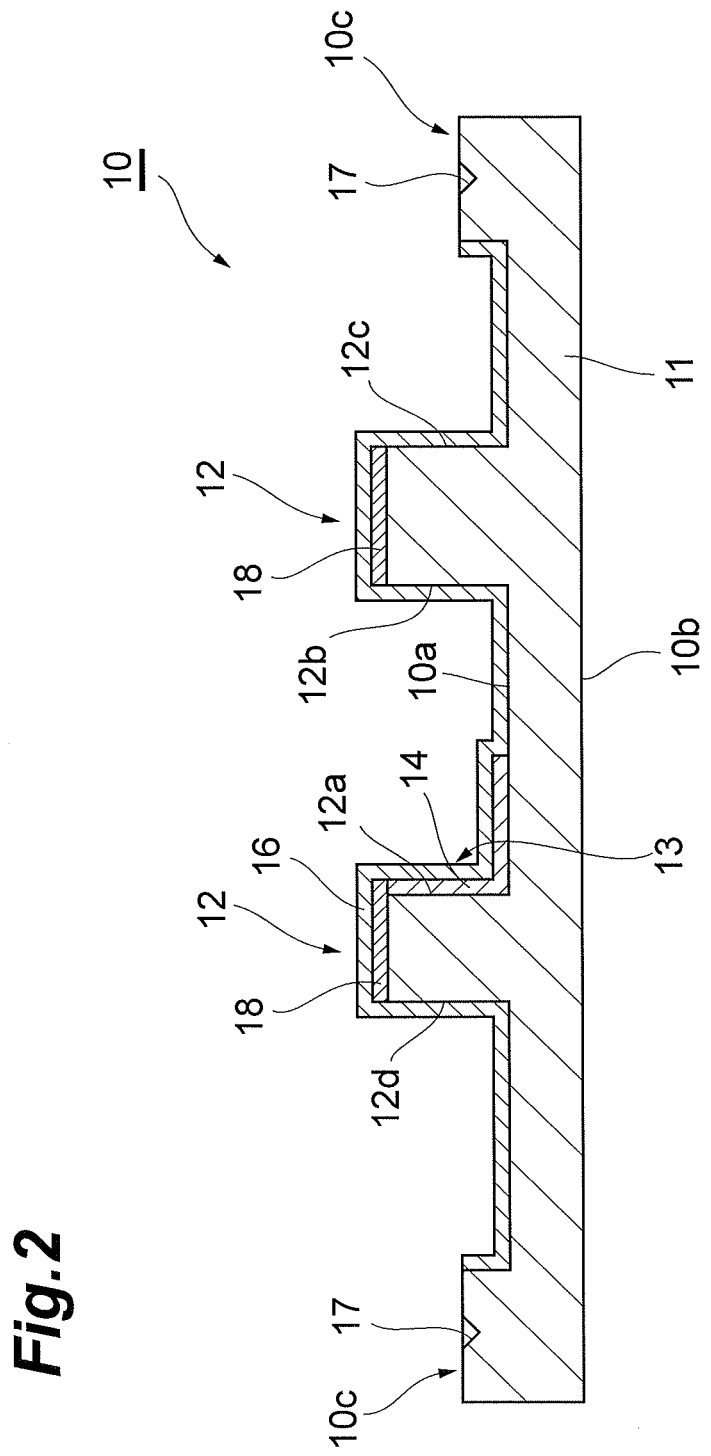
FIG. 2 is a diagram showing the cross-section taken along the line of II-II shown in FIG. 1.

FIG. 1 and FIG. 2 are diagrams showing a first plate-shaped member 10. FIG. 1 is a perspective view showing an appearance of the first plate-shaped member 10, and FIG. 2 is a diagram showing the cross-section taken along the line of II-II shown in FIG. 1. The first plate-shaped member 10 is a member prepared by applying etching to a silicon substrate, and is composed mainly of silicon. The first plate-shaped member 10 has a component forming surface 10a and a rear surface 10b on the opposite side of the component forming surface 10a.

As shown in FIG. 1, a light transmissive optical component 12 is formed on the side of the component forming surface 10a of the first plate-shaped member 10. The light transmissive optical component 12 is an optical component formed by applying etching to a silicon region 11 composing a silicon substrate, and allows light at a predetermined wavelength to transmit through it. The light transmissive optical component 12 of the present embodiment has a substantially V-shaped planar shape, and has four side surfaces 12a to 12d optically functioning. The side surface 12a is a semi-transmissive reflecting surface (half mirror), and has a reflectance of, for example, 30% to 50% for light in a range of wavelengths to be used. This semi-transmissive reflecting surface functions as a beam splitter in the Michelson interference optical system. The side surfaces 12b to 12d are light transmitting surfaces, and have transmittances of, for example, 90% to 99% for light in a range of wavelengths to be used.

As shown in FIG. 2, the side surface 12a of the light transmissive optical component 12 is covered with a semi-transmissive reflection film 13 formed of a silicon oxide film 14 formed on the side surface of the silicon region 11, and a silicon nitride film 16 formed on the silicon oxide film 14. The wavelength-reflection characteristics of the side surface 12a vary according to the respective thicknesses of the silicon oxide film 14 and the silicon nitride film 16. Further, the side surfaces 12b to 12d of the light transmissive optical component 12 is covered with an antireflection film (AR film) composed of the silicon nitride film 16 formed on the side surfaces of the silicon region 11. The wavelength-reflection characteristics of the side surfaces 12b to 12d vary according to the thickness of the silicon nitride film 16. In addition, the silicon oxide film 14 is formed from the side surface 12a of the light transmissive optical component 12 up to the area on the silicon region 11 around the light transmissive optical component 12, and is formed by thermally-oxidizing the silicon region 11 as will be described later. Further, the silicon nitride film 16 is formed over the entire surface on the silicon region 11 including the area on the silicon oxide film 14, and the areas on the side surfaces 12b to 12d of the light transmissive optical component 12. A silicon oxide film 18 is interposed between the upper surface of the light transmissive optical component 12 and the silicon nitride film 16. The silicon oxide film 18 is an etching mask used at the time of forming the light transmissive optical component 12 by applying etching to the silicon region 11.

A peripheral portion 10c of the first plate-shaped member 10 slightly projects in its thickness direction with respect to the component forming surface 10a, to surround the light transmissive optical component 12. A plurality of (two in the present embodiment) alignment marks 17 for alignment with a second plate-shaped member which will be described later are formed on the peripheral portion 10c. In one example, the one alignment mark 17 is formed on the peripheral portion 10c in one side of the first plate-shaped member 10, and the other alignment mark 17 is formed on the peripheral portion 10c in the other side (preferably, the side facing the one side) of the first plate-shaped member 10. These alignment marks 17 have an arbitrary planar shape of, for example, a cross shape, and is composed of trenches formed in the peripheral portion 10c in the present embodiment.

Figure 3:
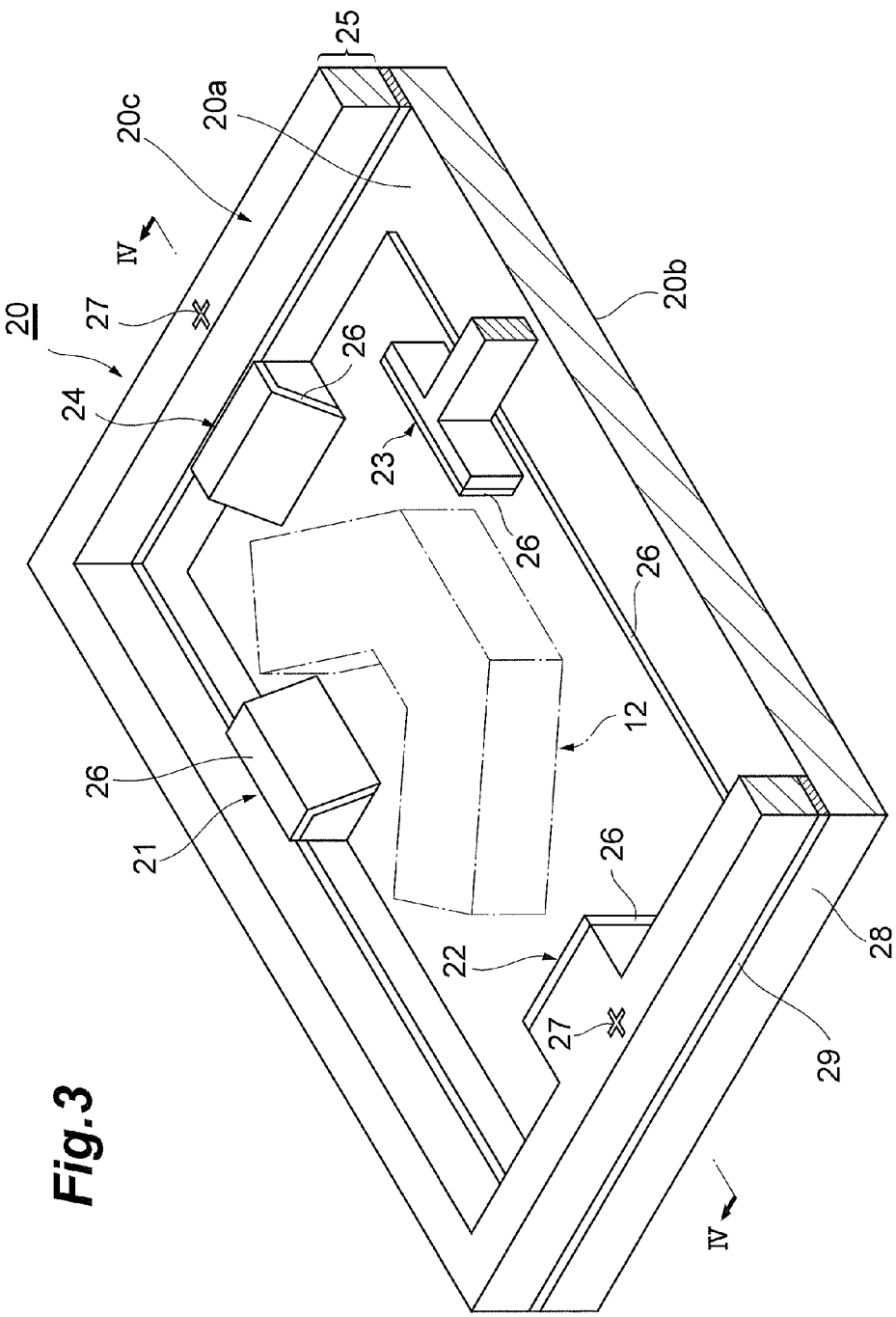
FIG. 3 is a perspective view showing an appearance of a second plate-shaped member.
Figure 4:
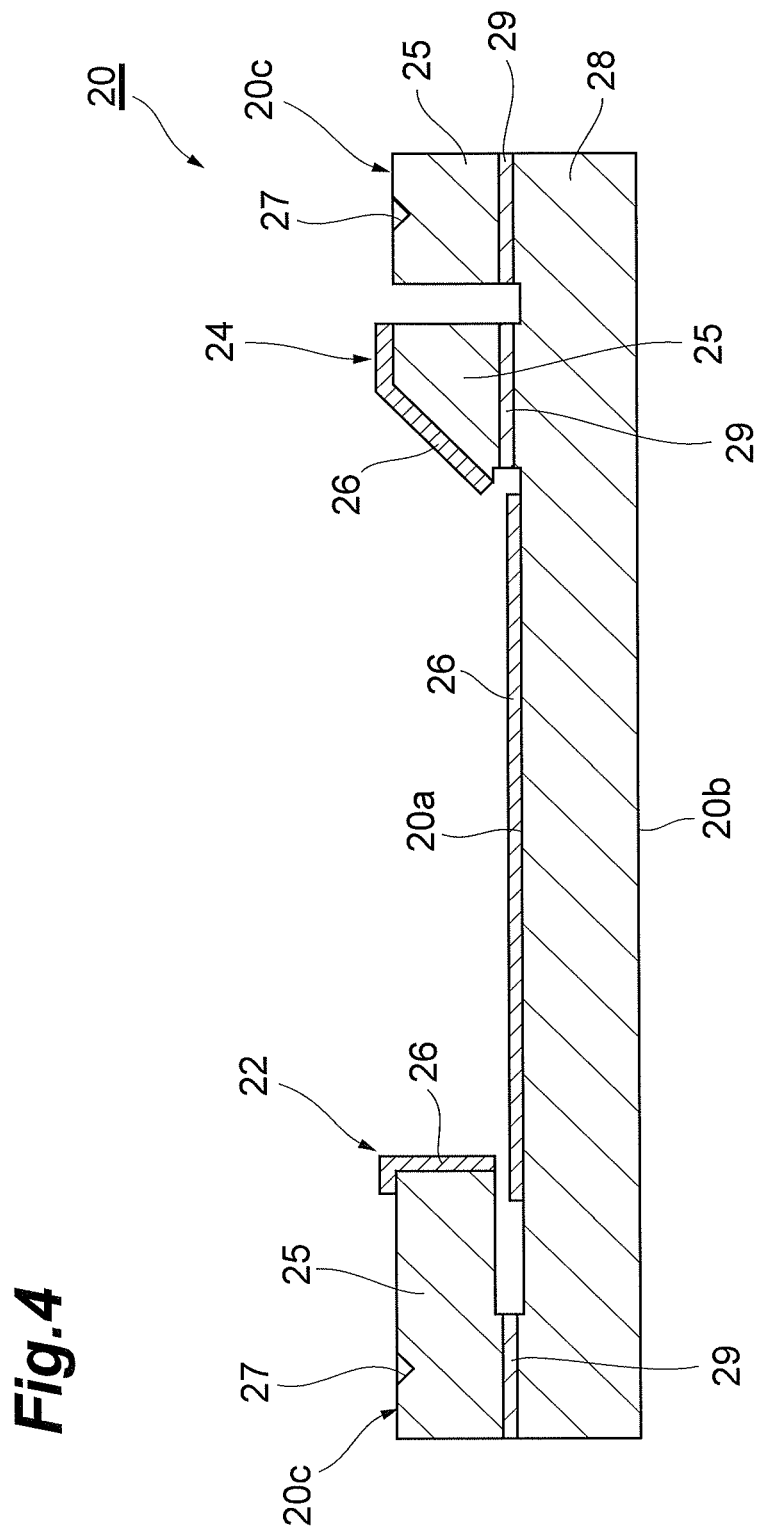
FIG. 4 is a diagram showing the cross-section taken along the line of IV-IV shown in FIG. 3.

FIG. 3 and FIG. 4 are diagrams showing a second plate-shaped member 20. FIG. 3 is a perspective view showing an appearance of the second plate-shaped member 20, and FIG. 4 is a diagram showing the cross-section taken along the line of Iv-Iv shown in FIG. 3. In addition, in FIG. 3, the position and the range of the light transmissive optical component 12 in a state in which the first plate-shaped member 10 and the second plate-shaped member 20 are bonded to one another are shown by the dashed-dotted line.

The second plate-shaped member 20 is a member prepared by applying etching to a silicon layer 25 of a so-called silicon on insulator (SOI) substrate in which an insulating layer 29 and the silicon layer 25 are laminated on a support substrate 28. The second plate-shaped member 20 has a principal surface 20a on which the support substrate 28 is exposed, and a rear surface 20b on the opposite side of the principal surface 20a. As shown in FIG. 3, an incident mirror 21, a fixed reflecting mirror 22, a movable reflecting mirror 23, and an exit mirror 24 are formed on the side of the principal surface 20a of the second plate-shaped member 20. These mirrors 21 to 24 are optical components in which a metal film 26 is formed on surfaces formed by applying etching to the silicon layer 25 of the SOI substrate, and totally reflect the light reaching these mirrors. In addition, in the present embodiment, the metal film 26 is formed on the principal surface 20a as well for convenience at the time of depositing the metal film 26. The respective mirror surfaces of the incident mirror 21 and the exit mirror 24 are inclined at an angle of, for example, 45° to the normal direction of the principal surface 20a. On the other hand, the respective mirror surfaces of the fixed reflecting mirror 22 and the movable reflecting mirror 23 are along the normal direction of the principal surface 20a, and formed so as to be substantially perpendicular to the principal surface 20a. The incident mirror 21 reflects light which transmits through the first plate-shaped member 10 from the normal direction of the principal surface 20a to be incident, toward the side surface 12a serving as a semi-transmissive reflecting surface of the light transmissive optical component 12. The fixed reflecting mirror 22 reflects the light emitted from the side surface 12c serving as a light transmitting surface of the light transmissive optical component 12, toward the side surface 12c. The movable reflecting mirror 23 reflects the light emitted from the side surface 12d serving as a light transmitting surface of the light transmissive optical component 12, toward the side surface 12d. In addition, the movable reflecting mirror 23 is capable of moving in parallel in a direction along an optical axis of incident light by an electrostatic actuator which will be described later. The exit mirror 24 reflects the light (interfering light) emitted from the side surface 12d serving as a light transmitting surface of the light transmissive optical component 12, toward the normal direction of the principal surface 20a. This interfering light transmits through the first plate-shaped member 10, to be emitted to the outside of the optical module.

A peripheral portion 20c of the second plate-shaped member 20 projects in its thickness direction with respect to the principal surface 20a, to surround the mirrors 21 to 24 which are the light reflective optical components. A plurality of (two in the present embodiment) alignment marks 27 for alignment with the first plate-shaped member 10 described above are formed at positions corresponding to the alignment marks 17 of the first plate-shaped member 10, on the peripheral portion 20c. In one example, the one alignment mark 27 is formed on the peripheral portion 20c in one side of the second plate-shaped member 20, and the other alignment mark 27 is formed on the peripheral portion 20c in the other side (preferably, the sided facing the one side) of the second plate-shaped member 20. These alignment marks 27 have a planar shape which is the same as that of the alignment marks 17 of the first plate-shaped member 10, and is composed of, for example, trenches formed in the peripheral portion 20c.

Figure 5:
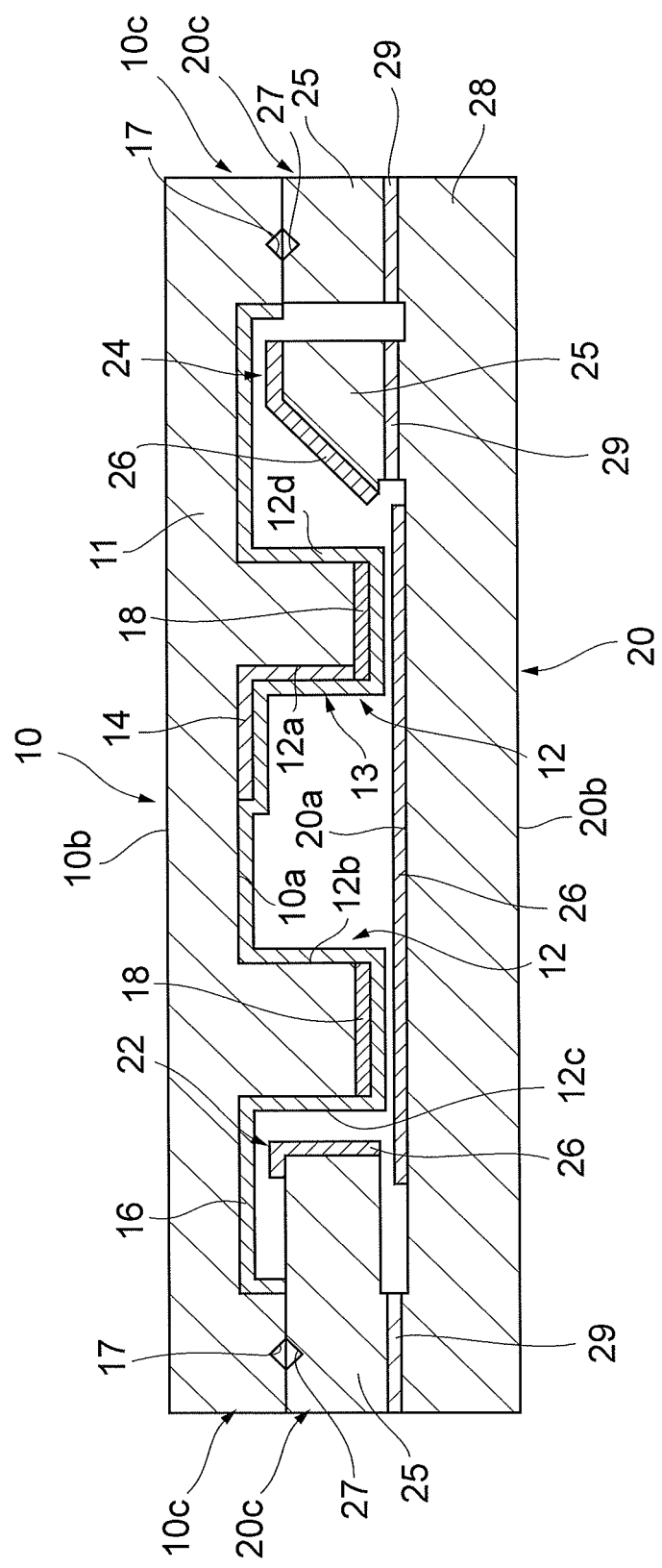
FIG. 5 is a cross-sectional view showing a state in which the first plate-shaped member and the second plate-shaped member are bonded to one another.

FIG. 5 is a cross-sectional view showing a state in which the first plate-shaped member 10 and the second plate-shaped member 20 are bonded to one another. As shown in FIG. 5, these plate-shaped members 10 and 20 are bonded to one another such that the component forming surface 10a on which the light transmissive optical component 12 is formed, of the first plate-shaped member 10, and the principal surface 20a of the second plate-shaped member 20 face one another. At this time, the light transmissive optical component 12 is disposed between the fixed reflecting mirror 22 and the exit mirror 24, and disposed between the incident mirror 21 and the movable reflecting mirror 23 shown in FIG. 3. Further, at this time, there is preferably a gap between the silicon nitride film 19 formed on the upper surface of the light transmissive optical component 12 and the metal film 26 formed on the principal surface 20a of the second plate-shaped member 20.

Figure 6:
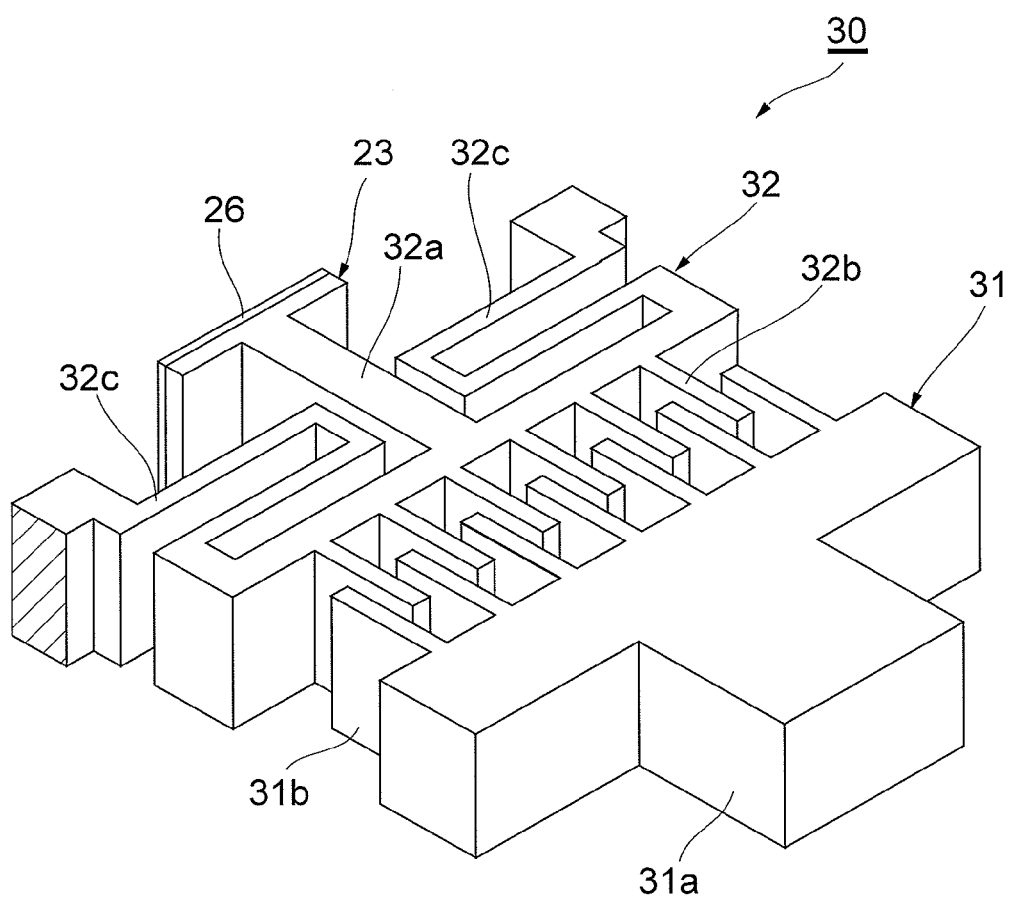
FIG. 6 is a perspective view showing an appearance of an electrostatic actuator that drives a movable reflecting mirror.

Here, FIG. 6 is a perspective view showing an appearance of an electrostatic actuator 30 that drives the movable reflecting mirror 23. As shown in FIG. 6, the electrostatic actuator 30 has a first electrode 31 fixed to the principal surface 20a of the second plate-shaped member 20, and a second electrode 32 fixed to the movable reflecting mirror 23. The electrostatic actuator 30 generates electrostatic force between the first electrode 31 and the second electrode 32, thereby relatively displacing the second electrode 32 with respect to the first electrode 31.

The first electrode 31 has a fixed portion 31a fixed to the support substrate 28 via the insulating layer 29 (refer to FIG. 4), and a comb portion 31b formed on the side surface of the fixed portion 31a facing the second electrode 32. In addition, the comb portion 31b is in a state of floating from the support substrate 28 by removing the insulating layer 29 between the portion and the support substrate 28.

The second electrode 32 is disposed between the movable reflecting mirror 23 and the first electrode 31. The second electrode 32 has a strut 32a which is extended in a direction perpendicular to the mirror surface of the movable reflecting mirror 23, to support the movable reflecting mirror 23 with its one end, a comb portion 32b which supports the other end of the strut 32a, and a supporting portion 32c which has a structure in which plate springs are coupled, to elastically support the both ends of the comb portion 32b. The strut 32a, the comb portion 32b, and the supporting portion 32c are in a state of floating from the support substrate 28 by removing the insulating layer 29 between those and the support substrate 28. Further, one end of the supporting portion 32c supports an end portion of the comb portion 32b, and the other end of the supporting portion 32c is fixed to the peripheral portion 20c (refer to FIG. 3) of the second plate-shaped member 20. With this configuration, the strut 32a and the comb portion 32b are capable of being displaced in a direction perpendicular to the mirror surface of the movable reflecting mirror 23. The comb portion 32b faces the comb portion 31b of the first electrode 31, and the comb teeth of the comb portion 32b are disposed between the respective comb teeth of the comb portion 31b.

When a predetermined voltage is applied to the second electrode 32, electrostatic force is applied between the comb portion 32b and the comb portion 31b. Because this electrostatic force is determined by a voltage value to be applied to the second electrode 32, a space between the comb portion 32b and the comb portion 31b is controlled by the voltage value. That is, the position in the direction perpendicular to the mirror surface of the movable reflecting mirror 23 supported by the comb portion 32b and the strut 32a is controlled by a voltage to be applied to the second electrode 32.

Figure 7:
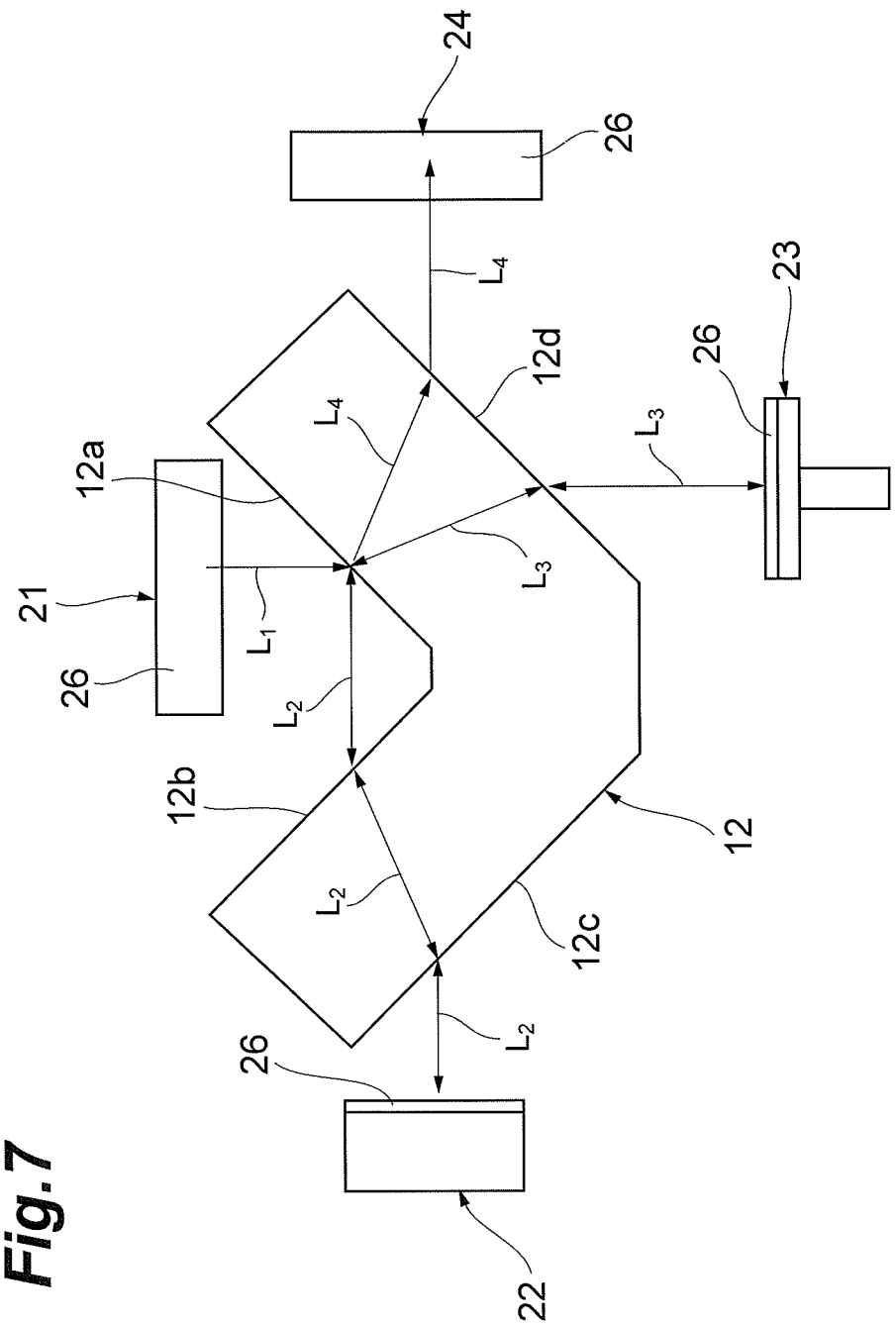
FIG. 7 is a plan view for explanation of a Michelson interference optical system configured by a light transmissive optical component and light reflective optical components.

FIG. 7 is a plan view for explanation of a Michelson interference optical system configured by the light transmissive optical component 12 and the light reflective optical components (the incident mirror 21, the fixed reflecting mirror 22, the movable reflecting mirror 23, and the exit mirror 24) which are described above. When measurement object light $L_1$ transmits through the first plate-shaped member 10 to be incident from the outside of the optical module, the incident mirror 21 reflects the measurement object light $L_1$ in a direction along the component forming surface 10a and the principal surface 20a. The measurement object light $L_1$ reaches the side surface 12a (semi-transmissive reflecting surface) of the light transmissive optical component 12. Measurement object light $L_2$ which is a part of the measurement object light $L_1$ is reflected on the side surface 12a, to be incident into the side surface 12b serving as a light transmitting surface, and transmits through the inside of the light transmissive optical component 12, to be emitted from the side surface 12c serving as a light transmitting surface. The measurement object light $L_2$ emitted from the side surface 12c is totally reflected on the fixed reflecting mirror 22, to thereafter track the same optical path described above back to the side surface 12a.

On the other hand, the remaining measurement object light $L_3$ other than the measurement object light $L_2$ of the measurement object light $L_1$ is incident into the light transmissive optical component 12 from the side surface 12a. This measurement object light $L_3$ transmits through the inside of the light transmissive optical component 12, to be emitted from the side surface 12d serving as a light transmitting surface, and reaches the movable reflecting mirror 23. Then, this measurement object light $L_3$ is totally reflected on the movable reflecting mirror 23, to thereafter track the same optical path described above back to the side surface 12a.

The measurement object light $L_2$ which is returned from the fixed reflecting mirror 22 to the side surface 12a and the measurement object light $L_3$ which is returned from the movable reflecting mirror 23 to the side surface 12a are coupled with each other on the side surface 12a, to become an interfering light image $L_4$. The interfering light image $L_4$ transmits through the inside of the light transmissive optical component 12, to be emitted from the side surface 12d, and reaches the exit mirror 24. The interfering light image $L_4$ is reflected on the exit mirror 24, and transmits through the first plate-shaped member 10, to be emitted to the outside of the optical module.

In one example, an incident angle of the measurement object light $L_1$ with respect to the side surface 12a and an incident angle of the measurement object light $L_2$ with respect to the side surface 12b are both set to 45°. Further, the side surface 12a and the side surface 12d of the light transmissive optical component 12 are set parallel to one another, and the side surface 12b and the side surface 12c are set parallel to one another. In this case, the incident angles and emitting angles are all 45° on all the side surfaces 12a to 12d, and all the same transmission characteristics are obtained as long as the antireflection films have the same thickness.

In addition, by designing a shape of the light transmissive optical component 12 such that the respective optical path lengths of the measurement object light components $L_2$ and $L_3$ in the light transmissive optical component 12 become equal to one another, it is possible to effectively cancel the effect by wavelength dispersion inside the silicon. Further, in order to equalize the respective optical path lengths of the measurement object light components $L_2$ and $L_3$ in the entire interference optical system, a sum of the optical path length of the measurement object light $L_2$ between the side surface 12a and the side surface 12b and the optical path length of the measurement object light $L_2$ between the side surface 12c and the fixed reflecting mirror 22, and the optical path length of the measurement object light $L_3$ between the side surface 12d and the movable reflecting mirror 23 are preferably equal to one another.

Next, a manufacturing method for the optical module according to the present embodiment will be described. FIG. 8 to FIG. 15 are diagrams showing the respective processes in a manufacturing method for the first plate-shaped member 10, and (a) in the figures are plan views of the region corresponding to the light transmissive optical component 12, and (b) in the figures are diagrams showing the cross-section taken along the line of B-B shown in (a).

<Mask Formation Process>

First, as shown in FIG. 8, a plate-shaped member including the silicon region 11 is prepared. As such a plate-shaped member, a silicon substrate, an SOI substrate in which an insulating layer and a silicon layer are laminated on a support substrate, or the like is preferable. Then, the silicon oxide film 18 is formed on the silicon region 11. This silicon oxide film 18 is a first mask in the present embodiment, and has a pattern corresponding to a planar shape of the light transmissive optical component 12 having the side surfaces 12a to 12d, that is a pattern along the side surfaces 12a to 12d. In consideration of that this silicon oxide film is subjected to high temperatures in a thermal oxidation process which will be described later, a silicon oxide film is formed on the entire surface on the silicon region 11 by, for example, thermal oxidation or thermal CVD, to thereafter appropriately form the silicon oxide film 18 by use of a usual photolithographic technique.

Next, as shown in FIG. 9, a silicon nitride film 41 (second mask) is formed so as to cover the entire surface on the silicon region 11. In consideration of that the silicon nitride film is subjected to high temperatures in a thermal oxidation process which will be described later, the silicon nitride film 41 is appropriately formed by, for example, a low pressure chemical vapor deposition method (LP-CVD: Low Pressure-Chemical Vapor Deposition) which is high temperature processing. At this time, the silicon oxide film 18 as well is covered with the silicon nitride film 41. Then, as shown in FIG. 10, a resist mask 42 (third mask) having an opening 42a is formed on the silicon nitride film 41. The opening 42a has a shape corresponding to a planar shape of a depressed portion in the silicon region 11 formed in the subsequent process, and is formed next to the silicon oxide film 18 so as not to be overlapped with the silicon oxide film 18 when viewed from the thickness direction of the silicon region 11. The planar shape of the opening 42a is, for example, a quadrangle shape, and one side thereof is overlapped with one side (a side corresponding to the side surface 12a of the light transmissive optical component 12) 18a of the silicon oxide film 18. Then, an opening is formed in the silicon nitride film 41 by applying etching to the silicon nitride film 41 by use of this resist mask 42 as an etching mask.

<First Etching Process>

Next, dry etching is applied to the silicon region 11 by use of the resist mask 42 as an etching mask. Thereby forming a depressed portion 11a in the silicon region 11, and simultaneously forming the side surface 12a of the light transmissive optical component 12 as a part of inner side surfaces of the depressed portion 11a. In addition, in the case where an SOI substrate is used as a plate-shaped member including the silicon region 11, the insulating layer functions as an etching stopper layer, and therefore, it is possible to control an etching depth with a high degree of accuracy. Further, in this process, for example, a deep RIE (reactive ion etching) process using a Bosch process may be used as a dry etching method. After this process, the resist mask 42 is removed.

In this first etching process, for example, wet etching using an alkaline etchant may be applied to the silicon region 11. Even in such a case, it is possible to appropriately form a side surface of the depressed portion 11a along the thickness direction (perpendicular to the board surface) of the silicon region 11 by a method of matching the side surface of the depressed portion 11a formed by etching to the crystal plane of the silicon region 11, or the like. As such a crystal plane, for example, a (100) plane or a (111) plane is preferable. In addition, in the case where the depressed portion 11a is formed by wet etching in this way, the resist mask 42 may be removed before etching, and the silicon nitride film 41 may be used as an etching mask.

<Thermal Oxidation Process>

Next, as shown in FIG. 11, the silicon oxide film 14 is formed by thermally oxidizing the inner surface (the inner side surfaces and the bottom surface) of the depressed portion 11a. At this time, because the surface of the silicon region 11 other than the inner surface of the depressed portion 11a is covered with the silicon nitride film 41, only the inner surface of the depressed portion 11a is thermally oxidized. Further, in this process, it is recommended that the film thickness of the silicon oxide film 14 formed by thermal oxidation be made to be approximately double (for example, 0.48 μm) the film thickness of the silicon oxide film 14 in a completed optical module. After this process, the silicon nitride film 41 is removed by use of a hot phosphoric acid solution heated to, for example, 150° C. to 170° C. (FIG. 12). By use of the hot phosphoric acid solution, it is possible to appropriately remove only the silicon nitride film 41 so that the silicon oxide films 14 and 18 remain.

<Second Etching Process>

Next, as shown in FIG. 13, the side surfaces 12b to 12d which are different from the side surface 12a are formed on the silicon region 11 by again applying etching to the silicon region 11 by use of the silicon oxide film 18 as an etching mask. Thereby, forming the light transmissive optical component 12. In addition, as an etching method in this process, any one of dry etching and alkaline wet etching may be used.

<Unnecessary Portion Removal Process>

Next, in order to remove an unnecessary portion 14a (refer to FIG. 13) in the silicon oxide film 14, for example, etching using dilute hydrofluoric acid is carried out. At this time, because the portion 14a which is not along the silicon region 11 in the silicon oxide film 14 is etched from the both directions of the inner and outer surfaces with the dilute hydrofluoric acid, the etching is performed at about double the speed of that for the other portion along the silicon region 11. Accordingly, in the timing when the portion 14a is completely removed, the other portion (particularly the portion on the side surface 12a) is etched by about a half of the film thickness. With this process, as shown in FIG. 14, the unnecessary portion 14a of the silicon oxide film 14 is removed, and the other portion of the silicon oxide film 14 remains. In the case where the thickness of the silicon oxide film 14 immediately after the formation of the film by thermal oxidation is 0.48 μm, the thickness of the silicon oxide film 14 after this process is 0.24 μm. Because the reflectance of the semi-transmissive reflection film 13 varies according to this thickness, it is preferable to perform the above-described thermal oxidation process in consideration of a decrease in thickness of the silicon oxide film 14 in this process.

In addition, the unnecessary portion 14a of the silicon oxide film 14 is removed by etching in the above-described process, however, depending on the thickness of the portion 14a, the portion 14a may be broken to be removed by water pressure at the time of wet processing.

<Nitride Film Formation Process>

Next, as shown in FIG. 15, the silicon nitride film 16 is formed on the entire surface of the silicon region 11. In this process, the silicon nitride film 16 is formed so as to cover at least the silicon oxide film 14 on the side surface 12a, and the other side surfaces 12b to 12d. With this, the silicon nitride film 16 serving as an antireflection film is formed on the side surfaces 12b to 12d, and at the same time, the silicon nitride film 16 composing a part of the semi-transmissive reflection film 13 is formed on the silicon oxide film 14. In addition, in this process, in order to uniformly form the silicon nitride film 16 on the silicon oxide film 14 and the side surfaces 12b to 12d, it is preferable to form the silicon nitride film 16 by use of a low pressure-chemical vapor deposition method (LP-CVD) which is high temperature processing.

According to the method described above, the first plate-shaped member 10 is appropriately prepared. On the other hand, the portion other than the electrostatic actuator 30 in the second plate-shaped member 20 is prepared as follows for example. First, an SOI substrate is prepared. A silicon oxide film is formed on the surface of the silicon layer of the SOI substrate. Next, an opening corresponding to the inclined mirror surface of the incident mirror 21, and an opening corresponding to the inclined mirror surface of the exit mirror 24 are formed by applying etching to this silicon oxide film. Then, a silicon nitride film is formed over the entire area on the silicon layer of the SOT substrate. Openings respectively corresponding to the incident mirror 21, the fixed reflecting mirror 22, the movable reflecting mirror 23, and the exit mirror 24 are formed by applying etching to this silicon nitride film.

Next, dry etching is applied to the silicon layer via the silicon nitride film and the silicon oxide film. At this time, this etching is continued to be applied to the silicon layer until the insulating layer of the SOI substrate is exposed. Thereby, forming the incident mirror 21, the fixed reflecting mirror 22, the movable reflecting mirror 23, and the exit mirror 24 in the silicon layer. Then, after the exposed side surface of the silicon layer is protected by the silicon oxide film, the silicon nitride film is removed. At this time, the silicon nitride film is selectively etched so as to remain the silicon oxide film by use of, for example, hot phosphoric acid or the like. With this, the openings in the silicon oxide film corresponding to the inclined mirror surfaces of the incident mirror 21 and the exit mirror 24 come out again, and the silicon layer of the portions is exposed. Thereafter, wet etching is applied to the exposed silicon layer. At this time, anisotropic etching is applied to the exposed portion of the silicon layer by, for example, alkaline etching. Thereby, forming the inclined mirror surfaces of the incident mirror 21 and the exit mirror 24 in the silicon layer.

Next, the silicon oxide film is removed, and the metal film 26 is formed on the respective mirror surfaces of the incident mirror 21, the fixed reflecting mirror 22, the movable reflecting mirror 23, and the exit mirror 24. First, a shadow mask is disposed so as to cover the component forming surface of the SOI substrate. One large opening which includes all the portions serving as mirror surfaces respectively in the incident mirror 21, the fixed reflecting mirror 22, the movable reflecting mirror 23, and the exit mirror 24 is formed in this shadow mask. Then, a metal material is physically deposited via this shadow mask, thereby forming the metal film 26 on the respective mirror surfaces. At this time, as a method for forming the metal film 26, not only a high-energy sputtering method, but also resistance deposition and EB deposition are preferable. In this way, the second plate-shaped member 20 is appropriately prepared.

Figure 16:
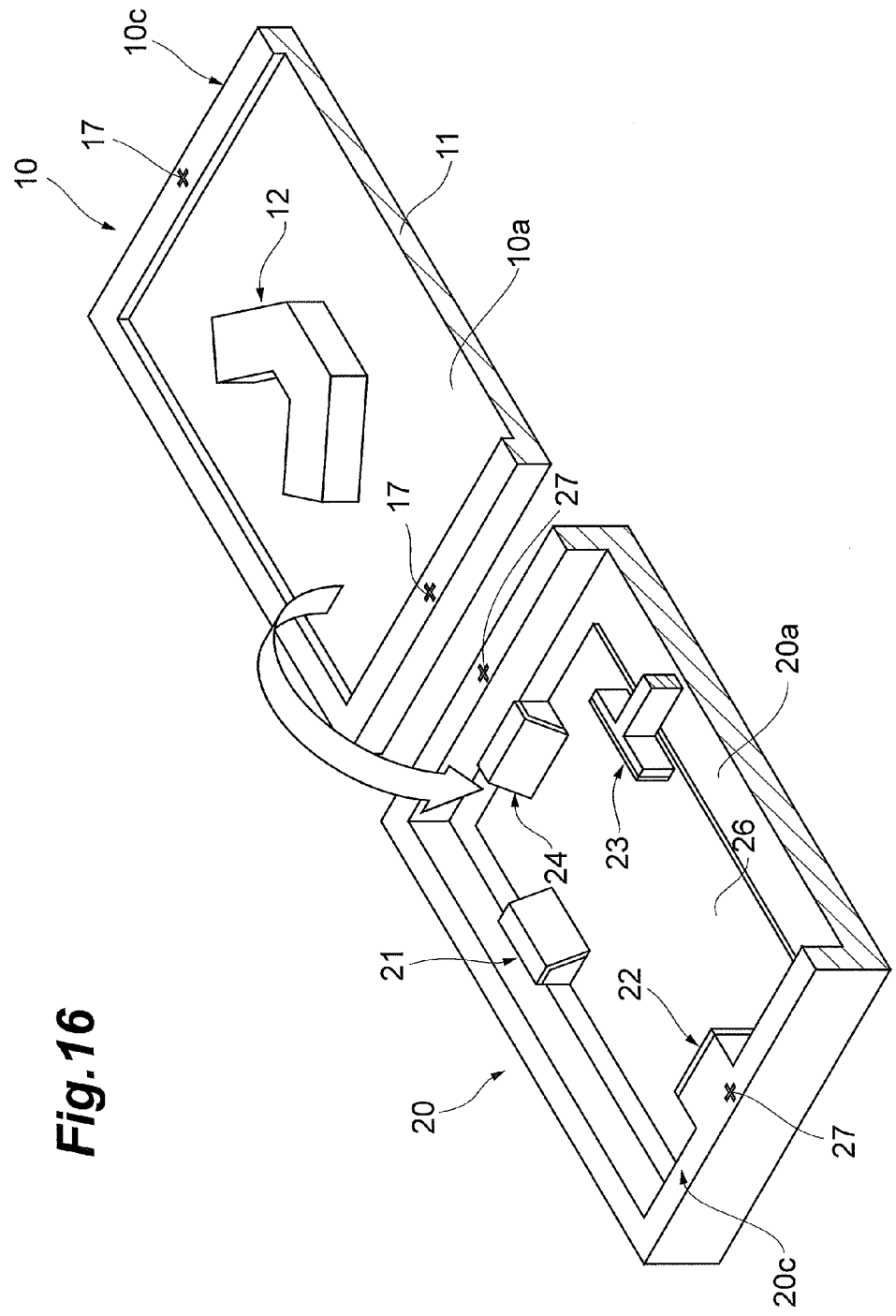
FIG. 16 is a perspective view schematically showing a state in which the first plate-shaped member and the second plate-shaped member are joined together.
Figure 17:
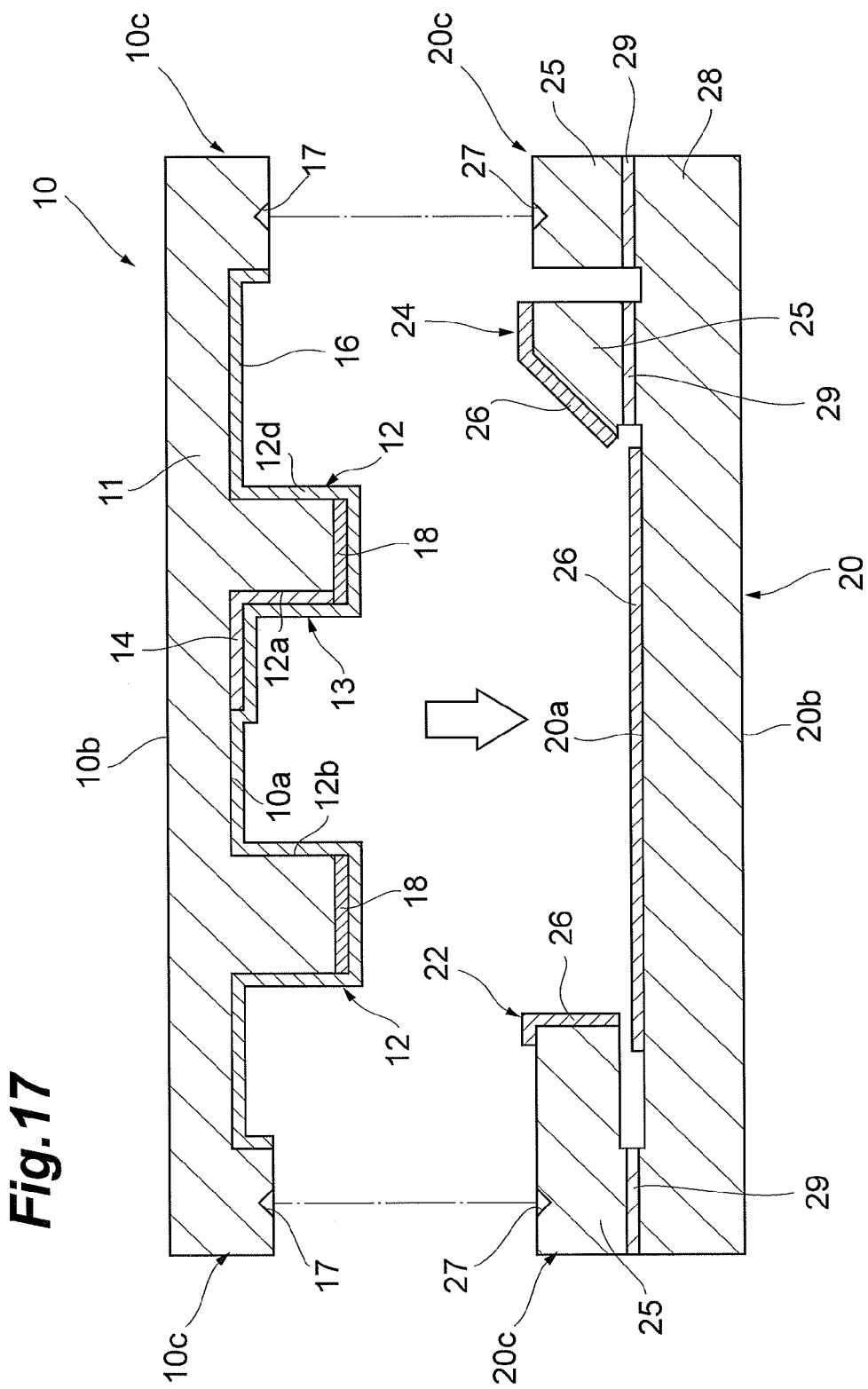
FIG. 17 is a diagram showing a state in which the first and second plate-shaped members are aligned so as to match the alignment marks.

FIG. 16 is a perspective view schematically showing a state in which the first plate-shaped member 10 and the second plate-shaped member 20 are joined together. In this process, the first and second plate-shaped members 10 and 20 are joined together such that the component forming surface 10a and the principal surface 20a face one another, and the light transmissive optical component 12 of the first plate-shaped member 10, and the incident mirror 21, the fixed reflecting mirror 22, the movable reflecting mirror 23, and the exit mirror 24 of the second plate-shaped member 20 are brought into the positional relationship shown in FIG. 7. At this time, the alignment marks 17 and 27 are formed respectively on the peripheral portion 10c of the first plate-shaped member 10 and the peripheral portion 20c of the second plate-shaped member 20, and it is recommended that, as shown in FIG. 17, the peripheral portions 10c and 20c be bonded to one another after the first and second plate-shaped members 10 and 20 are aligned such that these alignment marks 17 and 27 are matched to one another. Further, as a method for bonding the first and second plate-shaped members 10 and 20, a method of directly bonding those, a method of bonding those via solder, a method of bonding those via resin, or the like is preferable.

Effects by the manufacturing method for an optical component according to the present embodiment, which have been described above, will be described along with the problems confronting the general optical component using the MEMS technology.

In accordance with the MEMS technology, fine and highly-accurate processing using a semiconductor photolithographic technique is possible, and it is possible to appropriately prepare an optical component composing an optical interferometer and a diffracting grating or the like for processing light as a wave. In particular, in the MEMS process using a silicon substrate or an SOI substrate, because the silicon has moderate elasticity, it is possible to prepare a sensor or an actuator with good mechanical characteristics and high reliability, and it is possible to form an inclined plane by utilizing the anisotropic nature of silicon crystal, and form a deep trench using a Bosch process. Therefore, the MEMS technology is utilized for manufacturing an acceleration sensor, a pressure sensor, a pixel mirror of a projector (a digital mirror device or the like), an optical interferometer for an FTIR (Fourier Transform Infrared Spectrometer) spectroscope, and the like. In particular, an optical interferometer is broadly applicable, and is applicable to not only an FTIR, but also an OCT (Optical Coherent Tomography), and film thickness measurement, surface roughness measurement, and the like, and it is possible to compactly configure these measuring devices. However, in the case where various types of optical components are prepared by applying the MEMS process to silicon substrates and the like, there are problems which will be described hereinafter.

Figure 18:
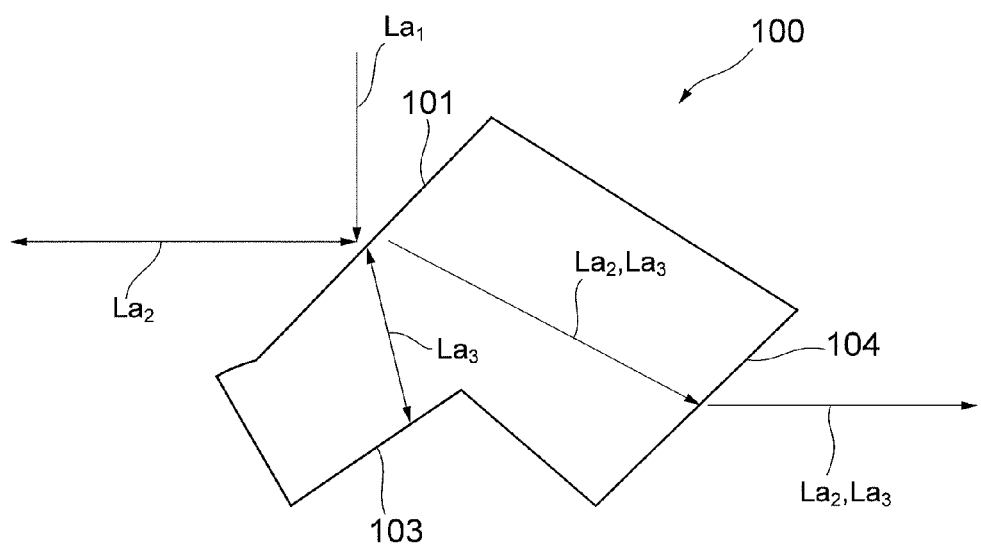
FIG. 18 is a plan view schematically showing a beam splitter used for an interference optical system or the like, as an example of a light transmissive optical component.

FIG. 18 is a plan view schematically showing a beam splitter 100 used for an interference optical system or the like, as an example of an optical component. This beam splitter 100 has a semi-transmissive reflecting surface 101, a light reflecting surface 103, and a light transmitting surface 104. Here, for example, because the refractive index of silicon in a wavelength band of 1 μm is approximately 3.5, the reflectance of Fresnel reflection on the silicon surface is approximately 30%. That is, 30% of light $La_1$ reaching the semi-transmissive reflecting surface 101 is reflected on the semi-transmissive reflecting surface 101. In addition, this reflected light $La_2$ is reflected by a movable reflecting mirror, which is not shown, to return to the semi-transmissive reflecting surface 101, and 70% of the light transmits through the semi-transmissive reflecting surface 101, to reach the light transmitting surface 104. Further, the remaining 70% ($La_3$) of the light $La_1$ is incident into the beam splitter 100 from the semi-transmissive reflecting surface 101, and is reflected on the light reflecting surface 103, to return to the semi-transmissive reflecting surface 101. 30% of the light $La_3$ returning to the semi-transmissive reflecting surface 101 is again reflected on the semi-transmissive reflecting surface 101, to reach the light transmitting surface 104. Then, the respective 70% of the light components $La_2$ and $La_3$ reaching the light transmitting surface 104 are emitted to the outside of the beam splitter 100 from the light transmitting surface 104.

However, the reflectance (30%) on the semi-transmissive reflecting surface 101 of the beam splitter 100 shown in FIG. 18 is not an ideal value as an optical interferometer. In an optical interferometer, an amplitude A of interfering light to be finally taken out is expressed by the following formula (1) given that a reflectance on the semi-transmissive reflecting surface 101 is r.

[Formula 1]

$$A = 2r(1-r) \tag{1}$$

In accordance with this formula (1), the amplitude A reaches a maximum value (0.5) when r is 0.5 (i.e., the reflectance is 50%). On the other hand, when r is 0.3 (i.e., the reflectance is 30%), A becomes 0.41, and the light use efficiency is decreased by approximately 20%. Moreover, because a loss of 30% is caused at the time of emitting the light components $La_2$ and $La_1$ from the beam splitter 100, the final light use efficiency is decreased to 41%×70%=28.7%. In addition, the reflectance on the light reflecting surface 103 is given as 100% in this calculation, meanwhile, in the case where it is impossible to form a metal film on the light reflecting surface 103, the light use efficiency is further lowered.

Such a lowering of the light use efficiency becomes more prominent due to compensation for wavelength dispersion of silicon. An optical path length of light transmitting through the inside of a light transmissive optical component formed of silicon differs according to wavelength of the light. For example, in the case where a wavelength of light transmitting through the light transmissive optical component is within a range from 1 μm to 1.7 μm, the refractive index of the light transmissive optical component formed of silicon varies according to a wavelength within a range of approximately 3.5±0.04. Here, the beam splitter 100 shown in FIG. 18 will be described as an example. Assuming that a beam width of the light components $La_1$ to $La_3$ is 150 μm, in order for the light components $La_2$ and $La_3$ to advance toward the light transmitting surface 104 without being blocked by the light reflecting surface 103, at least approximately 360 μm is needed as a length of an optical path between the semi-transmissive reflecting surface 101 and the light reflecting surface 103. Then, because the light $La_2$ goes back and forth on this optical path, the propagation distance of the light $La_2$ therebetween is approximately 720 μm. As a result, in the above-described wavelength range, 720 μm×±0.04=±29 μm, that is, 58 μm at a maximum is deviated in equivalent optical path length at each wavelength of the light $La_2$, which deteriorates the interfering light image. In addition, it is possible to calculate a phase deviation (which is equivalent to an optical path deviation) by use of the complex Fourier transform, meanwhile, this is unfavorable because the necessity of apodizing correction or the like is increased, which leads to deterioration in resolution.

Figure 19:
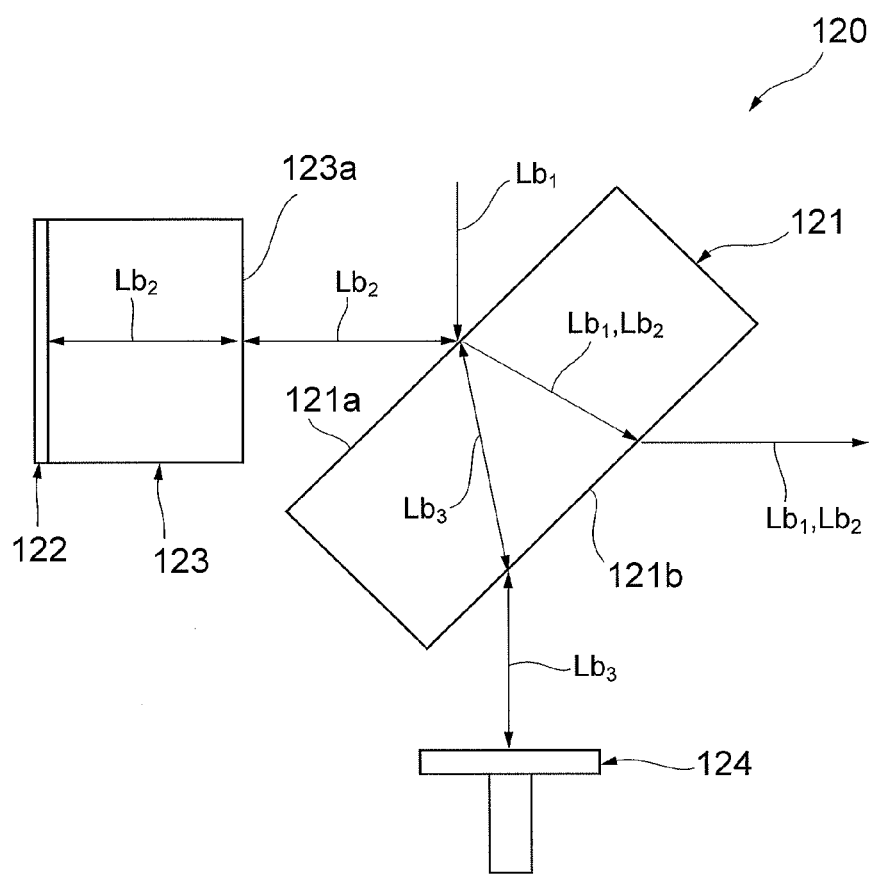
FIG. 19 is a plan view showing a configuration example of an interference optical system having an optical member for compensating wavelength dispersion.

For these reasons, an optical member for compensating wavelength dispersion is provided. FIG. 19 is a plan view showing a configuration example of an interference optical system having an optical member for compensating wavelength dispersion. As shown in FIG. 19, this interference optical system 120 has a beam splitter 121, a fixed reflecting mirror 122, a wavelength dispersion compensating member 123 made of silicon which is provided in front of the fixed reflecting mirror 122, and a movable reflecting mirror 124. One side surface 121a of the beam splitter 121 is utilized as an optical branching surface, and the other side surface 121b is utilized as a light transmitting surface. When light $Lb_1$ is incident into the side surface 121a of the beam splitter 121, $Lb_2$ which is a part (30%) of this light $Lb_1$ is reflected on the side surface 121a, and passes through a side surface 123a of the wavelength dispersion compensating member 123, to reach the fixed reflecting mirror 122. This light $Lb_2$ is reflected on the fixed reflecting mirror 122, and again passes through the side surface 123a of the wavelength dispersion compensating member 123, to return to the side surface 121a. On the other hand, the $Lb_3$ which is the other part (70%) of the light $Lb_1$ transmits through the side surface 121a, and is emitted from the side surface 121b, to reach the movable reflecting mirror 124. This light $Lb_3$ is reflected on the movable reflecting mirror 124, and again passes through the side surface 121b, to return to the side surface 121a. The light components $Lb_2$ and $Lb_3$ returning to the side surface 121a are emitted to the outside from the side surface 121b.

In accordance with the interference optical system 120 shown in FIG. 19, the optical path length of the light $Lb_2$ and the optical path length of the light $Lb_3$ are equalized, thereby it is possible to compensate the above-described wavelength dispersion. However, when an optical member for wavelength dispersion compensation (the wavelength dispersion compensating member 123) is provided in this way, the number of light transmitting surfaces through which light passes is increased, and a loss is caused every time the light passes through those light transmitting surfaces, which leads to a further lowering of the light use efficiency. For example, in the interference optical system 120 shown in FIG. 19, the light use efficiency is as follows.

[Formula 2]

$$2\times\sqrt{30\%\times70\%\times70\%\times70\%\times70\%\times70\%\times70\%\times70\%\times30\%\times70\%}=14.4\% \quad (2)$$

The problem as described above is relieved by providing an antireflection film (AR coat) on the light transmitting surface, and providing a semi-transmissive reflection film on the optical branching surface. For example, in the case where antireflection films with a reflectance of 5% are formed on the side surfaces 121b and 123a of the interference optical system 120 shown in FIG. 19, and a semi-transmissive reflection film with a reflectance of 50% is formed on the side surface 121a, the light use efficiency is greatly improved as follows.

[Formula 3]

$$2\times\sqrt{95\%\times50\%\times95\%\times95\%\times50\%\times95\%\times95\%\times50\%\times95\%}=41\% \quad (3)$$

An antireflection film is prepared by forming, for example, a silicon nitride film on a light transmitting surface by use of a CVD or the like. Further, a semi-transmissive reflection film is prepared by laminating, for example, a silicon oxide film and a silicon nitride film on an optical branching surface by use of a CVD or the like. However, in the case where such an interference optical system is prepared by the MEMS technology, an antireflection film and a semi-transmissive reflection film are formed on side surfaces formed by applying etching to a silicon substrate or an SOI substrate. In the case where a side surface is largely inclined or nearly vertical with respect to a substrate surface, it is difficult to uniformly form a silicon oxide film onto the side surface by CVD or the like.

In response to the problem described above, in the manufacturing method for an optical component according to the present embodiment, after the depressed portion 11a having an inner side surface serving as a semi-transmissive reflecting surface 12a is formed in the silicon region 11, this inner side surface is thermally oxidized, to form the silicon oxide film 14. In accordance with this method, it is possible to form the silicon oxide film 14 on the inner side surface with a uniform thickness, differently from the case where CVD is used, even in the case where the inner side surface (semi-transmissive reflecting surface 12a) is largely inclined (or nearly vertical) with respect to the substrate surface. Then, the silicon nitride film 16 is formed so as to cover the silicon oxide film 14, thereby it is possible to appropriately form the semi-transmissive reflection film 13 on the inner side surface. Further, in the manufacturing method for an optical component according to the present embodiment, it is possible to appropriately form the silicon nitride film 16 serving as an antireflection film on the respective side surfaces 12b to 12d of the light transmissive optical component 12.

Figure 20:
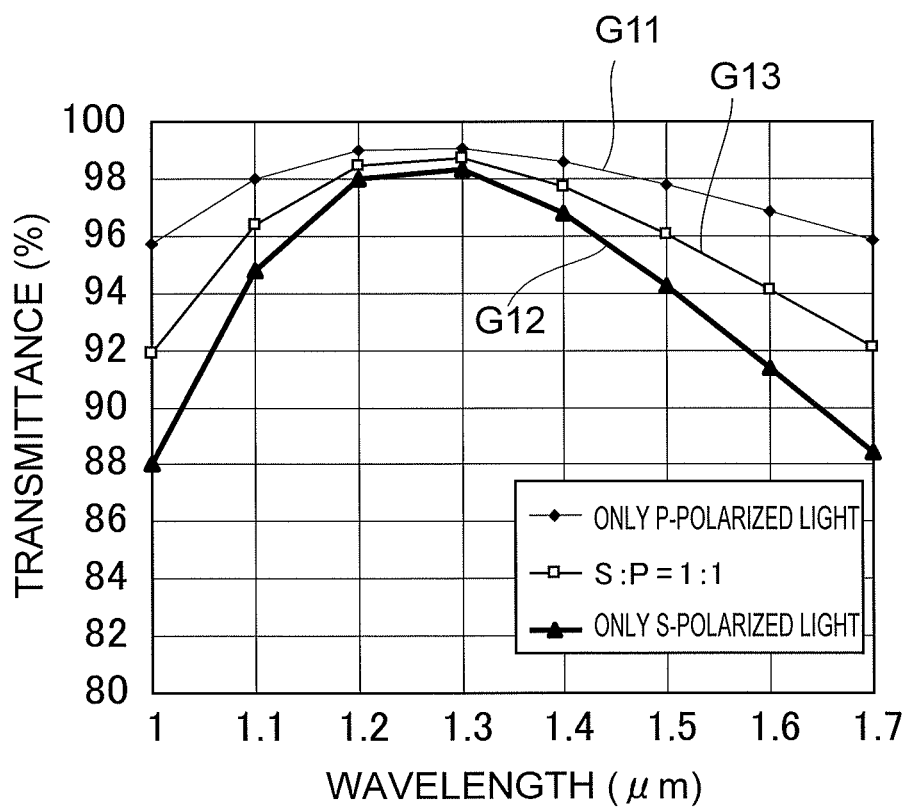
FIG. 20 is a graph showing the light transmission characteristics of a light transmitting surface in the case where a thickness of a silicon nitride film formed on the light transmitting surface is set to 0.179 μm.

Here, the effect caused by providing the semi-transmissive reflection film 13 and the antireflection film (silicon nitride film 16) will be described in more detail. FIG. 20 is a graph showing the light transmission characteristics of the respective side surfaces 12b to 12d in the case where a thickness of the silicon nitride film 16 (refractive index 1.9) formed on the side surfaces 12b to 12d is set to 0.179 μm. In addition, in FIG.

20, the horizontal axis denotes the wavelength (unit: μm), and the vertical axis denotes the transmittance (%). Further, in the drawing, the graph G11 shows the light transmission characteristics for P-polarized light, the graph G12 shows the light transmission characteristics for S-polarized light, and the graph G13 shows the light transmission characteristics for light in which P-polarized light and S-polarized light are equally contained.

Figure 21:
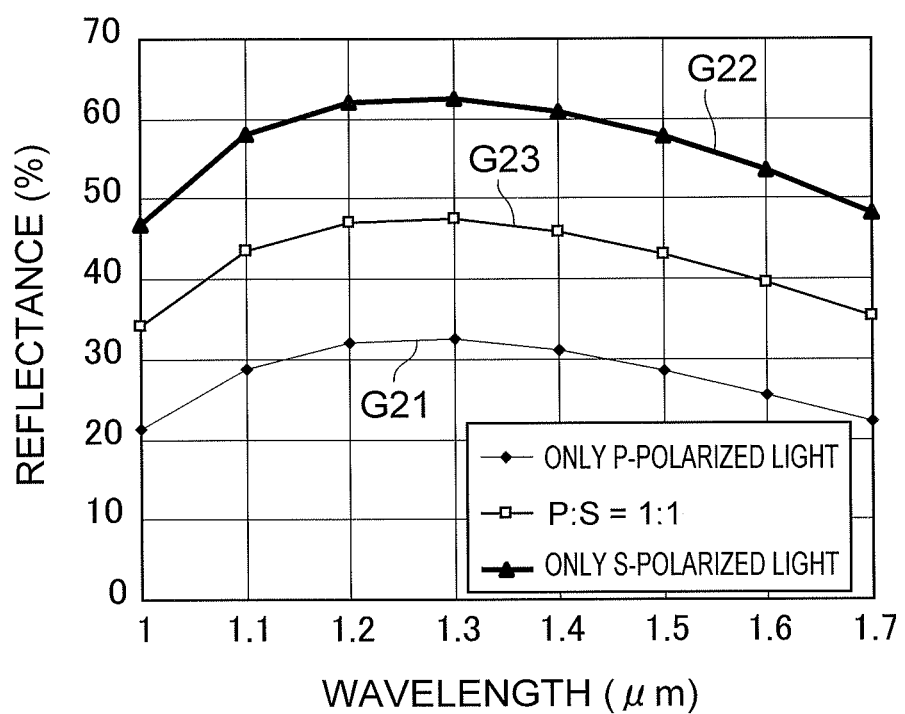
FIG. 21 is a graph showing the light reflection characteristics of a semi-transmissive reflecting surface in the case where a thickness of a silicon oxide film formed on the semi-transmissive reflecting surface is set to 0.24 μm, and a thickness of a silicon nitride film formed thereon is set to 0.179 μm.

Further, FIG. 21 is a graph showing the light reflection characteristics of the side surface 12a in the case where a thickness of the silicon oxide film 14 (refractive index 1.5) formed on the side surface 12a is set to 0.24 μm, and a thickness of the silicon nitride film 16 (refractive index 1.9) formed thereon is set to 0.179 μm. In addition, in FIG. 21, the horizontal axis denotes the wavelength (unit: μm), and the vertical axis denotes the reflectance (%). Further, in the drawing, the graph G21 shows the light reflection characteristics for P-polarized light, the graph G22 shows the light reflection characteristics for S-polarized light, and the graph G23 shows the light reflection characteristics for light in which P-polarized light and S-polarized light are equally contained.

In addition, in the present embodiment, because the incident angles to the respective side surfaces 12b to 12d are 45° which is large, as shown in FIG. 20 and FIG. 21, the transmittance on the light transmitting surface (the side surfaces 12b to 12d) and the reflectance on the semi-transmissive reflecting surface (the side surface 12a) are dependent on a direction of polarization of measurement object light. In addition, in the case where measurement object light is not coherent in a spectroscope or the like, it is probable that P-polarized light and S-polarized light are mixed, and therefore, the light transmission characteristics shown on the graph G13 in FIG. 20 and the light reflection characteristics shown on the graph G23 in FIG. 21 may be the best approximation to the proper characteristics.

Here, for comparison, the case where the semi-transmissive reflection film 13 or the antireflection film (the silicon nitride film 16) is not formed on the side surfaces 12a to 12d of the light transmissive optical component 12 is considered. In this case, the reflectance of the side surface 12a is 30%, and the transmittance of the side surfaces 12b to 12d is 70%. Accordingly, an amplitude of interfering light $L_4$ output from the optical interference system is

[Formula 4]

$$2 \times \sqrt{30\% \times 70\% \times 70\% \times 70\% \times 70\% \times 70\% \times 70\%} \times \sqrt{70\% \times 70\% \times 70\% \times 30\% \times 70\%} = 10\% \quad (4)$$

that is an extremely low value.

Meanwhile, in the present embodiment, the semi-transmissive reflection film 13 or the antireflection film (the silicon nitride film 16) is formed on the side surfaces 12a to 12d. Accordingly, even in the case where a wavelength of measurement object light is 1 μm or 1.7 μm (that is, at wavelengths in which the transmittance and the reflectance are respectively lowest in FIG. 20 and FIG. 21), an amplitude of interfering light $L_4$ output from the optical interference system is

[Formula 5]

$$2 \times \sqrt{34\% \times 92\% \times 92\% \times 92\% \times 92\% \times 66\% \times 92\%} \times \sqrt{66\% \times 92\% \times 92\% \times 34\% \times 92\%} = 32\% \quad (5)$$

and the light use efficiency is significantly improved as compared with the above-described comparison example. Further, in the case where a wavelength of measurement object light is 1.2 to 1.3 μm (that is, in a wavelength range in which the transmittance and the reflectance are high in FIG. 20 and FIG. 21), an amplitude of the interfering light $L_4$ is

[Formula 6]

$$2 \times \sqrt{47\% \times 98\% \times 98\% \times 98\% \times 98\% \times 53\% \times 98\%} \times \sqrt{53\% \times 98\% \times 98\% \times 47\% \times 98\%} = 46\% \quad (6)$$

and the light use efficiency is further improved. Accordingly, in the case where it is possible to narrow the wavelength range of measurement object light on the intended use, it is possible to further improve the light use efficiency.

In addition, in the present embodiment, in order to compensate wavelength dispersion, the light transmissive optical component 12 has a portion through which the measurement object light $L_2$ is allowed to transmit, meanwhile, such a configuration for compensation of wavelength dispersion may be omitted. For example, for use in using monochromatic light such as laser light, there is no need to compensate wavelength dispersion, and therefore, the side surfaces 12b and 12c of the light transmissive optical component 12 may be omitted. Accordingly, in such a case, it is possible to further reduce a loss caused by reflection on the side surfaces 12b and 12c.

Further, in the present embodiment, the fixed reflecting mirror 22 is formed separately from the light transmissive optical component 12, meanwhile, in place of the fixed reflecting mirror 22, a metal film serving as a reflecting mirror may be formed on the side surface 12c of the light transmissive optical component 12. With this, it is possible to cut a loss due to the transmission of the measurement object light $L_2$ through the side surface 12c, which makes it possible to further improve the light use efficiency. In addition, such a metal film is appropriately formed only on the side surface 12c by use of, for example, a hard mask. Further, in this case, it is recommended that a direction of the side surface 12c be set, not parallel to the side surface 12b, but perpendicular to the optical axis of the measurement object light $L_2$.

Further, in the present embodiment, the light transmissive optical component 12 and the electrostatic actuator 30 are respectively formed on the separate plate-shaped members 10 and 20. Accordingly, at the time of forming these on the respective plate-shaped members 10 and 20, it is possible to match the characteristics such as an impurity concentration of the substrate to the characteristics most suitable for the respective optical components. For example, impurities are not added to the silicon region 11 of the first plate-shaped member 10 on which the light transmissive optical component 12 is formed, to inhibit absorption of light, and appropriate amounts of impurities are added to the silicon layer 25 of the second plate-shaped member 20 on which the electrostatic actuator 30 is formed, to secure favorable electric conductivity, thereby it is possible to improve the electrical characteristics of a conductive component such as an electrostatic actuator 30 that drives the movable reflecting mirror 23.

Further, as in the present embodiment, it is preferable to further carry out an unnecessary portion removal process of removing an unnecessary portion 14a of the silicon oxide film 14 between the thermal oxidation process and the nitride film formation process. In the case where, as in the present embodiment, only a part of the inner side surface of the depressed portion 11a is used as a semi-transmissive reflecting surface 12a, such an unnecessary portion removal process is further carried out, thereby removing the unnecessary portion 14a of the silicon oxide film 14, which makes it possible to prepare the desired-shaped light transmissive optical component 12.

Further, as in the present embodiment, in the nitride film formation process, it is preferable to form the silicon nitride film 16 by use of LP-CVD. With this, it is possible to uniformly form the silicon nitride film 16 on the semi-transmissive reflecting surface 12a which is largely inclined (or nearly vertical) with respect to the substrate surface.

In addition, in the present embodiment, the peripheral portion 10c of the first plate-shaped member 10 slightly projects in its thickness direction with respect to the component forming surface 10a, and the peripheral portion 20c of the second plate-shaped member 20 projects in its thickness direction with respect to the principal surface 20a. The forms of the peripheral portions 10c and 20c are not limited to those, and for example, one of the peripheral portions 10c and 20c may not project, and the other one may project in a large way, thereby bringing these into contact with one another. In particular, in the case where the second plate-shaped member 20 is prepared from an SOI substrate as in the present embodiment, it is preferable that the support substrate 28 is exposed on the peripheral portion 20c by applying etching to the insulating layer 29 to remove the insulating layer, and the exposed support substrate 28 and the peripheral portion 10c of the first plate-shaped member 10 are bonded to one another. Further, in this case, it is preferable that the upper surface of the light transmissive optical component 12 of the first plate-shaped member 10 is etched to a slight extent, to be lower than the upper surface of the peripheral portion 10c, thereby preventing the light transmissive optical component 12 and the second plate-shaped member 20 from contacting each other.

First Modified Example

Figure 22:
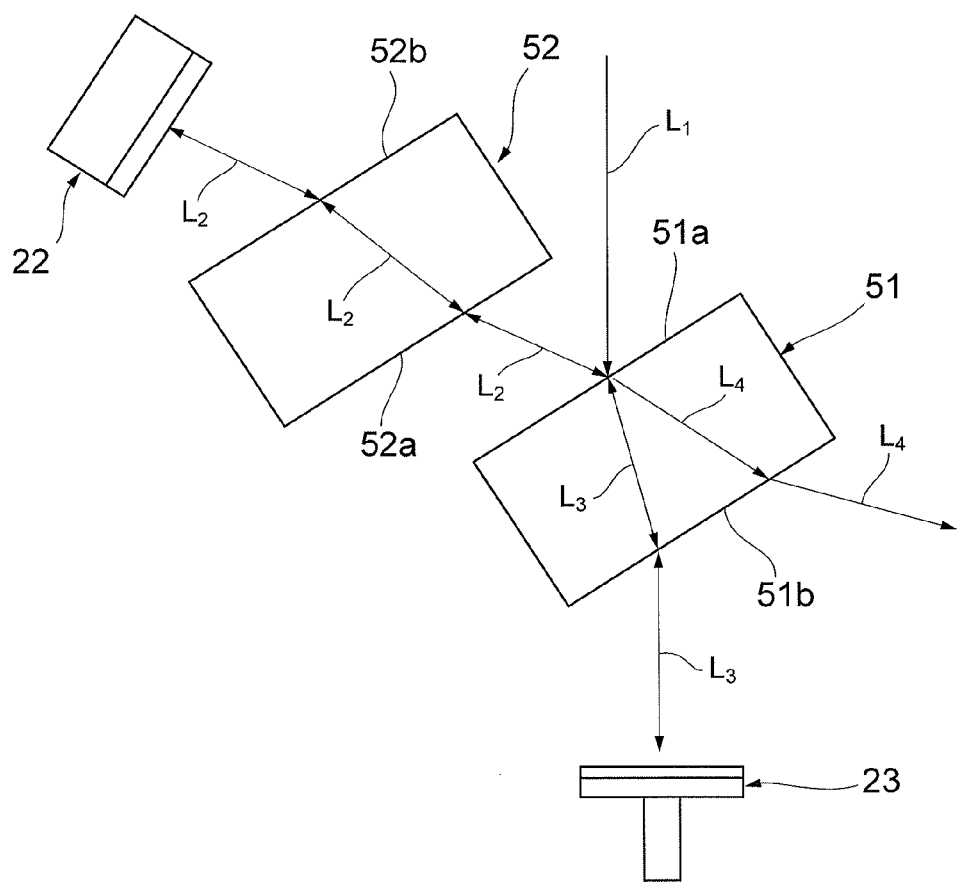
FIG. 22 is a plan view showing an interference optical system including two light transmissive optical components as a modified example.

In the above-described embodiment, the side surfaces 12a to 12d of the light transmissive optical component 12 are formed on one member, meanwhile, the semi-transmissive reflecting surface and the light transmitting surface of the light transmissive optical component may be formed on separate components. FIG. 22 is a plan view showing an interference optical system including two light transmissive optical components 51 and 52 in place of the light transmissive optical component 12, as a modified example of the above-described embodiment. In this interference optical system, the one light transmissive optical component 51 has a side surface 51a serving as a semi-transmissive reflecting surface and a side surface 51b serving as a light transmitting surface. Further, the other light transmissive optical component 52 has side surfaces 52a and 52b serving as light transmitting surfaces.

Measurement object light $L_1$ incident from the outside of this interference optical system reaches the side surface 51a (semi-transmissive reflecting surface) of the light transmissive optical component 51. Measurement object light $L_2$ which is a part of the measurement object light $L_1$ is reflected on the side surface 51a, to be incident into the side surface 52a serving as a light transmitting surface, and transmits through the inside of the light transmissive optical component 52, to be emitted from the side surface 52b serving as a light transmitting surface. The measurement object light $L_2$ emitted from the side surface 52b is totally reflected on the fixed reflecting mirror 22, to thereafter track the same optical path described above back to the side surface 51a.

On the other hand, the remaining measurement object light $L_3$ other than the measurement object light $L_2$ in the measurement object light $L_1$ is incident into the light transmissive optical component 51 from the side surface 51a. This measurement object light $L_3$ transmits through the inside of the light transmissive optical component 51, to be emitted from the side surface 51b serving as a light transmitting surface, and reaches the movable reflecting mirror 23. Then, this measurement object light $L_3$ is totally reflected on the movable reflecting mirror 23, to thereafter track the same optical path described above back to the side surface 51a.

The measurement object light $L_2$ which is returned from the fixed reflecting mirror 22 to the side surface 51a, and the measurement object light $L_3$ which is returned from the movable reflecting mirror 23 to the side surface 51a are coupled with each other at the side surface 51a, to become an interfering light image $L_4$. The interfering light image $L_4$ transmits through the inside of the light transmissive optical component 51, to be emitted from the side surface 51b to the outside of the interference optical system.

These light transmissive optical components 51 and 52 are appropriately prepared by a method which is similar to the method shown in FIG. 8 to FIG. 15 in the above-described embodiment. Accordingly, the light transmissive optical components 51 and 52 are integrated via the plate-shaped member, and are simultaneously formed by use of one etching mask, and therefore, it is possible to high-accurately and easily realize a desired relative positional relationship of those. In addition, in the same way as in the above-described embodiment, in the case where there is no need to compensate wavelength dispersion of measurement object light, installation of the light transmissive optical component 52 may be omitted.

Figure 23:
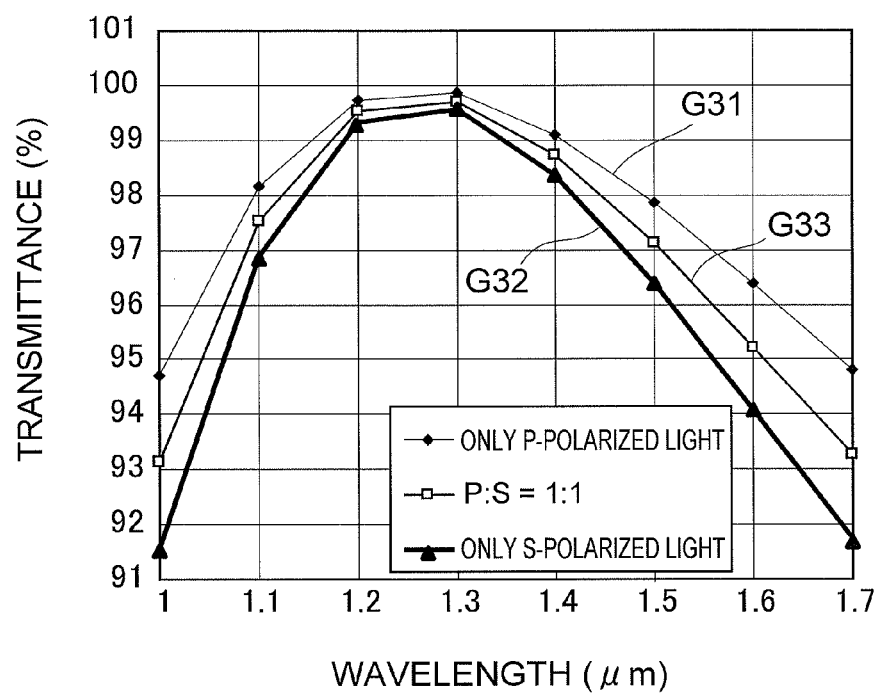
FIG. 23 is a graph showing the light transmission characteristics of a light transmitting surface in the case where a thickness of a silicon nitride film is set to the same in the embodiment.
Figure 24:
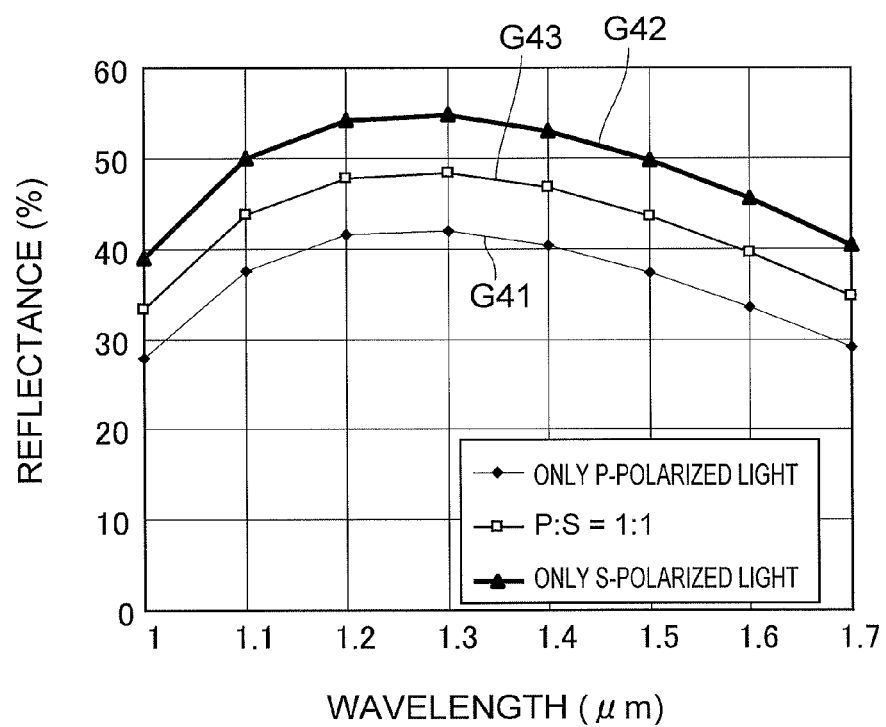
FIG. 24 is a graph showing the light reflection characteristics of a semi-transmissive reflecting surface in the case where the thicknesses of a silicon oxide film and a silicon nitride film are set to the same in the embodiment.

Further, in the above-described embodiment, an incident angle or an emitting angle for the respective side surfaces 12a to 12d of the light transmissive optical component 12 is set to 45°, meanwhile, an incident angle or an emitting angle for the respective side surfaces of the light transmissive optical component may be set to any angle within a range smaller than the total reflection critical angle. For example, in the present modified example, an incident angle of the measurement object light $L_1$ for the side surface 51a and an incident angle of the measurement object light $L_2$ for the side surface 52a are both set to 30°. Further, the side surface 51a and the side surface 51b of the light transmissive optical component 51 are set parallel to one another, and the side surface 52a and the side surface 52b of the light transmissive optical component 52 are set parallel to one another. In this case, all the incident angles and emitting angles are 30° for all the side surfaces 51a, 51b, 52a, and 52b, which makes it possible to reduce the polarization dependency as compared with the above-described embodiment in which those are set to 45°. In addition, FIG. 23 is a graph showing the light transmission characteristics of the respective side surfaces 51b, 52a, and 52b in the case where a thickness of a silicon nitride film is set to the same in the above-described embodiment. In the drawing, the graphs G31 to G33 respectively show the light transmission characteristics for P-polarized light, S-polarized light, and light in which P-polarized light and S-polarized light are equally contained. Further, FIG. 24 is a graph showing the light reflection characteristics of the side surface 51a in the case where the thicknesses of a silicon oxide film and a silicon nitride film are set to the same in the above-described embodiment. In the drawing, the graphs G41 to G43 respectively show the light reflection characteristics for P-polarized light, S-polarized light, and light in which P-polarized light and S-polarized light are equally contained. As shown in FIG. 23 and FIG. 24, it is understood that, in the case where the incident angles and the emitting angles with respect to the light transmissive optical components are smaller than those in the above-described embodiment, the final light use efficiency is not a large difference as compared with that in the above-described embodiment, on the other hand, the polarization dependency is reduced.

In addition, in the present modified example as well, in place of the fixed reflecting mirror 22, a metal film serving as a reflecting mirror may be formed on the side surface 52b of the light transmissive optical component 52. With this, it is possible to cut a loss due to the transmission of the measurement object light $L_2$ through the side surface 52b, which makes it possible to further improve the light use efficiency. In this case, it is recommended that a direction of the side surface 52b be set, not parallel to the side surface 52a, but perpendicular to the optical axis of the measurement object light $L_2$.

Second Modified Example

Figure 25:
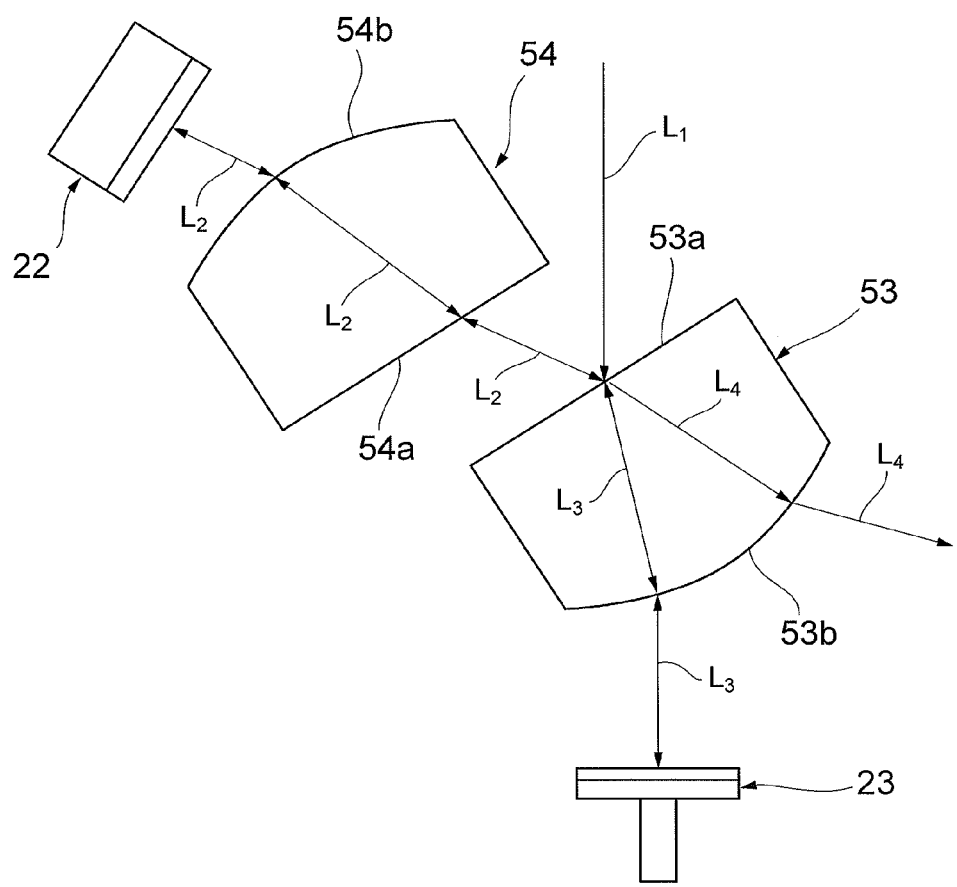
FIG. 25 is a plan view showing a configuration of an interference optical system as a second modified example.

FIG. 25 is a plan view showing a configuration of an interference optical system as a second modified example of the above-described embodiment. The interference optical system according to the present modified example includes two light transmissive optical components 53 and 54 in the same way as the first modified example. Measurement object light $L_1$ incident from the outside of this interference optical system reaches a side surface 53a (a semi-transmissive reflecting surface) of the light transmissive optical component 53. Measurement object light $L_2$ which is a part of the measurement object light $L_1$ is reflected on the side surface 53a, to be incident into a side surface 54a, and transmits through the inside of the light transmissive optical component 54, to be emitted from a side surface 54b. The measurement object light $L_2$ is totally reflected on the fixed reflecting mirror 22, to thereafter return to the side surface 53a. On the other hand, the remaining measurement object light $L_3$ other than the measurement object light $L_2$ in the measurement object light $L_1$ is incident into the light transmissive optical component 53 from the side surface 53a. This measurement object light $L_3$ transmits through the inside of the light transmissive optical component 53, to be emitted from a side surface 53b, and is totally reflected on the movable reflecting mirror 23, to thereafter return to the side surface 53a. The measurement object light $L_2$ which is returned from the fixed reflecting mirror 22 to the side surface 53a and the measurement object light $L_3$ which is returned from the movable reflecting mirror 23 to the side surface 53a are coupled each other on the side surface 53a, to become an interfering light image $L_4$. The interfering light image $L_4$ transmits through the inside of the light transmissive optical component 53, to be emitted from the side surface 53b to the outside of the interference optical system.

The interference optical system according to the present modified example is different from the first modified example in the point of the shape of the light transmitting surfaces of the light transmissive optical components. That is, in the present modified example, the side surface 53b of the light transmissive optical component 53 and the side surface 54b of the light transmissive optical component 54 are formed into convex-shaped curved surfaces, so as to make these side surfaces 53b and 54b have lens effects, thereby converging the measurement object light components $L_2$ and $L_3$, and the interfering light $L_4$.

Basically, it is desirable to propagate measurement object light as parallel light in an optical interferometer, however, it is difficult, in principle, to transform measurement object light into a fully parallel light. Accordingly, in practice, a spread angle of measurement object light is made narrower to an acceptable degree within a range of the optical path length of the measurement object light, and the light is regarded as parallel light. However, there is a correlation between a spread angle and a beam diameter of the measurement object light in parallel light, and it is necessary to enlarge the beam diameter in order to narrow the spread angle, however, in an interference optical system as in the present embodiment prepared by the MEMS technology, because a size of a light transmitting surface is limited depending on a thickness of the silicon region 11, a size of a beam diameter is limited.

In response to this problem, in the present modified example, because the side surfaces 53b and 54b are made to have the lens effects, it is possible to narrow spread angles of the measurement object light components $L_2$ and $L_3$, and the interfering light $L_4$ emitted from the side surfaces 53b and 54b. Accordingly, even in the case where it is impossible to sufficiently widen the side surfaces 53b and 54b, it is possible to appropriately configure the interference optical system.

In addition, the side surfaces (light transmitting surfaces) of the light transmissive optical component are not necessarily formed into lens shapes, and the light reflecting surfaces of the fixed reflecting mirror 22 and the movable reflecting mirror 23 may be formed into lens shapes. However, the side surfaces of the light transmissive optical components are formed into lens shapes as in the present modified example, thereby converging measurement object light onto the fixed reflecting mirror and the movable reflecting mirror, and therefore, it is possible to further improve the light use efficiency.

Third Modified Example

Figure 26:
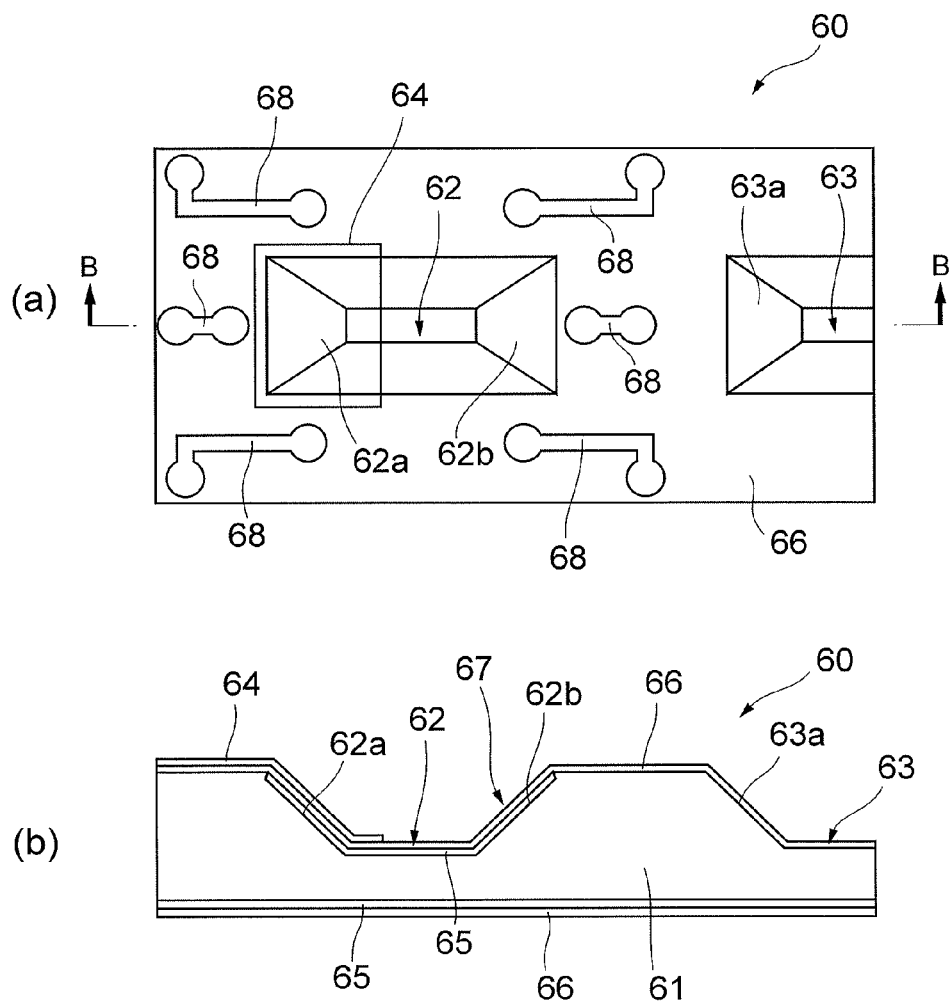
FIG. 26 includes diagrams showing a configuration of a light transmissive optical component according to a third modified example.

In the embodiment and the respective modified examples described above, the side surfaces (the semi-transmissive reflecting surfaces and the light transmitting surfaces) of the light transmissive optical component are formed along the thickness direction of the plate-shaped member (in other words, perpendicular to the component forming surface), meanwhile, the side surfaces serving as semi-transmissive reflecting surfaces and the like of the light transmissive optical component may be formed along a direction inclined with respect to the thickness direction of the plate-shaped member. FIG. 26 includes diagrams showing an example of a light transmissive optical component having such side surfaces. (a) in FIG. 26 is a plan view of a light transmissive optical component 60 according to the present modified example, and (b) in FIG. 26 is a sectional side view taken along the line of B-B in (a) in FIG. 26.

This light transmissive optical component 60 has two depressed portions 62 and 63 formed on the surface side of a plate-shaped member (for example, a silicon substrate) including a silicon region 61. A metal film 64 is formed on one side surface 62a of the depressed portion 62, and the side surface 62a functions as a light reflecting surface. A silicon oxide film 65 is formed on the other side surface 62b of the depressed portion 62, and a silicon nitride film 66 is further formed thereon. The silicon oxide film 65 and the silicon nitride film 66 compose a semi-transmissive reflection film 67, and the side surface 62b functions as a semi-transmissive reflecting surface. Further, the silicon nitride film 66 serving as an antireflection film is formed on one side surface 63a of the depressed portion 63. This side surface 63a functions as a light transmitting surface. In addition, the silicon oxide film 65 and the silicon nitride film 66 are formed on the rear surface as well of the silicon region 61.

The side surfaces 62a and 62b, and the side surface 63a are inclined at a predetermined angle of, for example, 45° with respect to the thickness direction of the silicon region 61. Accordingly, a part of light incident into the side surface 62b serving as a semi-transmissive reflecting surface from the thickness direction of the silicon region 61 is reflected in a direction perpendicular to the direction (in the board surface direction of the plate-shaped member). Further, the remaining part of the light incident into the side surface 62b transmits through the side surface 62b, to be reflected on the rear surface of the silicon region 61, and further transmits through the side surface 63a, to be thereafter emitted to the direction.

This light transmissive optical component 60 is appropriately prepared by a method which is similar to the method for the light transmissive optical component 12 of the first embodiment described above, however, the method for forming the depressed portions is slightly different. That is, at the time of manufacturing the light transmissive optical component 60 of the present modified example, after an etching mask made of silicon nitride which has openings corresponding to the planar shapes of the depressed portions 62 and 63 is formed on the silicon region 61, wet etching is applied to the silicon region 61. This wet etching is crystal anisotropic etching by use of, for example, an alkaline etchant. In detail, in the case where the normal direction of the principal surface of the silicon region 61 is along, for example, the <100> direction, the openings in the etching mask are formed in consideration of the crystal orientation, and the silicon region 61 is etched by use of an etchant in which IPA (isopropyl alcohol) is mixed with KOH (potassium hydroxide), thereby forming the side surfaces 62a and 62b, and the side surface 63a at an angle of inclination of 45° utilizing the (110) plane of silicon crystal. Further, in the case where the normal direction of the principal surface of the silicon region 61 is along, for example, the <110> direction, the silicon region 61 is etched by use of an etchant of KOH (potassium hydroxide), TMAH (tetramethylammonium hydroxide), or the like, thereby forming the side surfaces 62a and 62b, and the side surface 63a at an angle of inclination of 45° utilizing the (100) plane of silicon crystal.

A specific example of a manufacturing method for the light transmissive optical component 60 will be hereinafter described. First, a first mask made of silicon oxide which has a pattern along the inner side surfaces of the depressed portions 62 and 63 (i.e., an opening corresponding to the planar shape of the depressed portion 62) is formed on the silicon region 61, and further, a second mask made of silicon nitride, which has an opening corresponding to the planar shape of the depressed portion 62, and covers the depressed portion 63 is formed on the silicon region 61 and the first mask (mask formation process). Next, wet etching as described above is applied to the silicon region 61, thereby forming the inclined side surfaces 62a and 62b of the depressed portion 62.

Next, thermal oxidation is applied onto the inner surface (the side surfaces and the bottom surface) of the depressed portion 62, thereby forming a silicon oxide film 65 on the inner surface including the side surfaces 62a and 62b of the depressed portion 62 (thermal oxidation process). Thereafter, after the second mask is removed by use of hot phosphoric acid, wet etching is performed by use of the exposed first mask, thereby forming the inclined side surface 63a of the depressed portion 63. In addition, in this example, because the first mask is made of silicon oxide, it is possible to make the etching selectivity by use of TMAH higher than that by use of KOH as an etchant (an etching rate for a silicon oxide film is slower). Accordingly, it is preferable that the normal direction of the principal surface of the silicon region 61 is along the <110> direction so as to be able to form an inclined plane (the side surface 63a) by use of TMAH.

Next, the silicon nitride film 66 is formed on the entire surface on the silicon region 61 (nitride film formation process). Then, the metal film 64 on the side surface 62a and wiring patterns 68 around the depressed portion 62 are formed by a light exposure method using a spray resist coater. In this way, the light transmissive optical component 60 shown in FIG. 26 is appropriately prepared.

Figure 27:
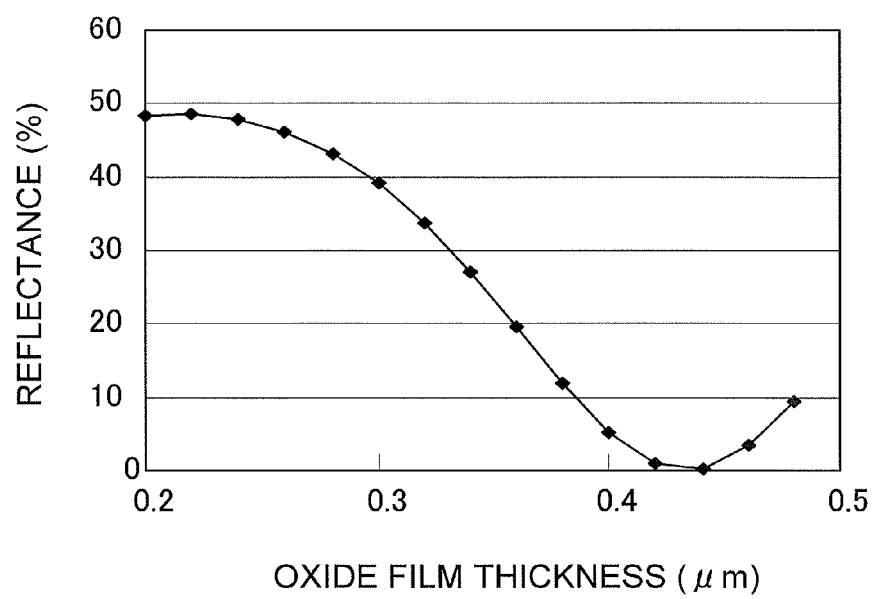
FIG. 27 is a graph showing a change in the reflectance of a semi-transmissive reflection film when a thickness of a silicon oxide film is changed.

Here, FIG. 27 is a graph showing a change in the reflectance of the semi-transmissive reflection film 67 when a thickness of the silicon oxide film 65 on the side surface 62b is changed in the case where a thickness of the silicon nitride film 66 is set so as to minimize the reflectance on the light transmitting surface (the side surface 63a). As shown in FIG. 27, it is understood that, in the case where a thickness of the silicon nitride film 66 is optimized for the light transmitting surface, it is possible to arbitrarily set the reflectance of the semi-transmissive reflection film 67 within a range from approximately 50% to nearly 0% by changing the thickness of the silicon oxide film 65.

Figure 28:
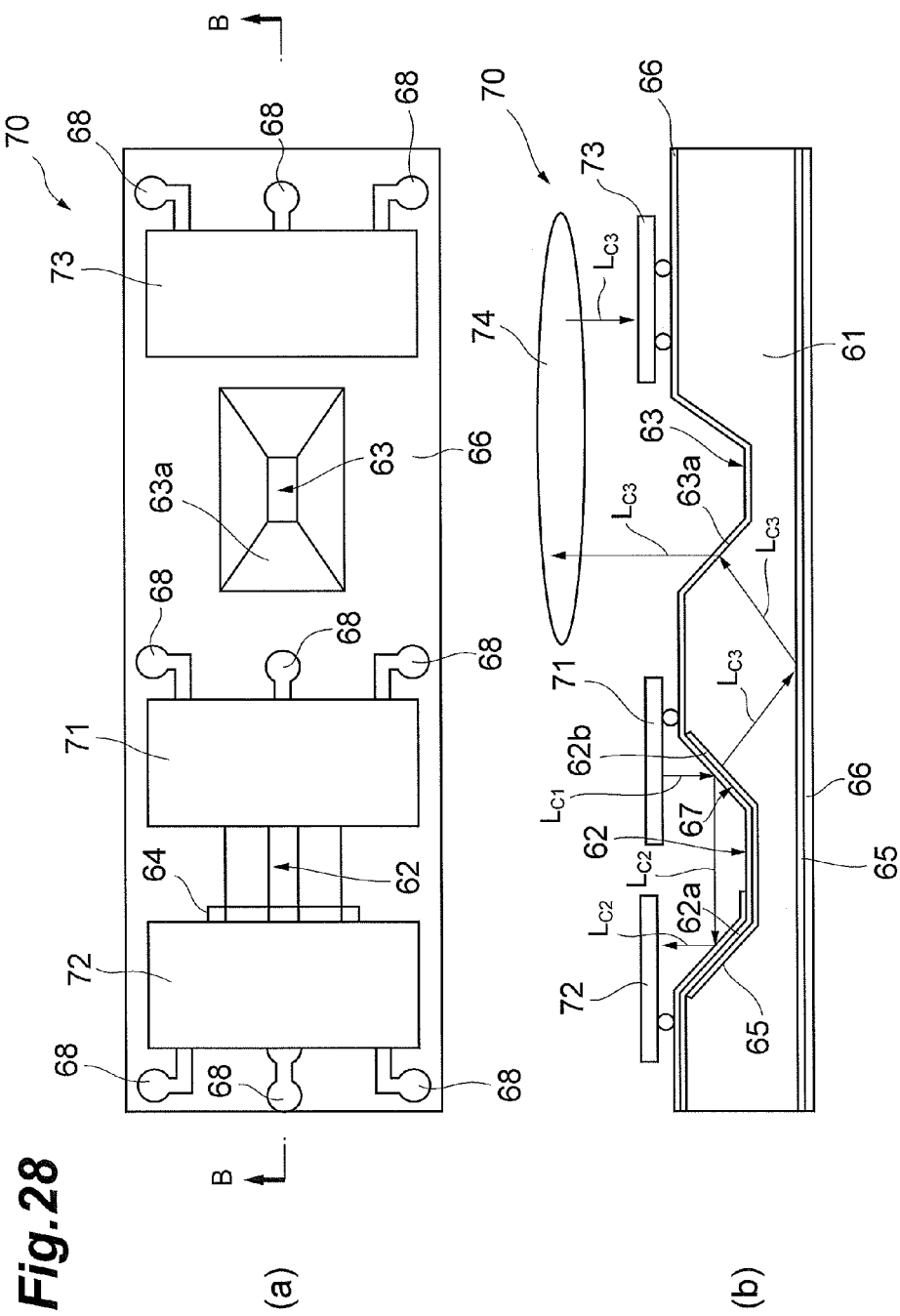
FIG. 28 includes diagrams showing an example that the light transmissive optical component according to the third modified example is applied to a distance measuring head.

FIG. 28 includes diagrams showing an example that the light transmissive optical component 60 described above is applied to a distance measuring head. (a) in FIG. 28 is a plan view of a distance measuring head 70 according to the present modified example, and (b) in FIG. 28 is a sectional side view taken along the line of B-B in (a) in FIG. 28.

This distance measuring head 70 includes, in addition to the light transmissive optical component 60 described above, a light-emitting element such as a surface emitting laser element (VCSEL) 71, and two photodetection elements such as photodetectors (PD) 72 and 73. The surface emitting laser element 71 is mounted on the depressed portion 62 so as to cover the side surface 62b of the light transmissive optical component 60, and emits laser light $Lc_1$ contained in a wavelength band of not less than 1 μm and not more than 1.7 μm, toward the side surface 62b. Light $Lc_2$ of a part of this laser light $Lc_1$ is reflected on the side surface 62b, to go toward the side surface 62a. The light $Lc_2$ is reflected in the thickness direction of the silicon region 61 on the side surface 62a. The photodetector 72 is mounted on the depressed portion 62 so as to cover the side surface 62a of the light transmissive optical component 60, and receives the light $Lc_2$ reflected on the side surface 62a, to generate an electric signal (reference signal) corresponding to an intensity of this light $Lc_2$.

Further, the remaining part $Lc_3$ of the laser light $Lc_1$ transmits through the side surface 62b, to be incident into the silicon region 61, and is reflected on the rear surface of the silicon region 61. At this time, because the light $Lc_3$ is incident into the rear surface of the silicon region 61 at an angle equal to or larger than the total-reflection critical angle, a metal film or the like is not particularly needed for the rear surface of the silicon region 61. Thereafter, the light $Lc_3$ transmits through the side surface 63a to be emitted in the thickness direction of the silicon region 61. This light $Lc_3$ is emitted to the outside of the distance measuring head 70, to reach a distance measuring target, and is reflected on the distance measuring target, to return to the distance measuring head 70. The photodetector 73 is mounted on the silicon region 61 other than the depressed portions 62 and 63 of the light transmissive optical component 60, and receives the light $Lc_3$ returning to the distance measuring head 70, to generate an electric signal (distance signal) corresponding to an intensity of this light $Lc_3$.

In addition, the light $Lc_3$ in the two light components $Lc_2$ and $Lc_3$ which are branched from the laser light $Lc_1$, is projected on the distance measuring target from the distance measuring head 70, and therefore, it is preferable to allocate an intensity higher than that of the light $Lc_2$ to the light $Lc_3$. Therefore, it is preferable to set a thickness of the silicon oxide film 65 such that the reflectance on the side surface 62b becomes 5% to 10% (FIG. 27). Further, it is preferable to dispose a cap with lens 74 on the optical path of the light $Lc_3$ after being emitted from the side surface 63a. With this, it is possible to cause the light $Lc_3$ to reach a more distant distance measuring target. Further, it is possible to converge the light $Lc_3$ returning to the distance measuring head 70 onto the photodetector 73.

Further, in the example shown in FIG. 28, a backside incident type photodetector is used as the photodetector 73. With this, it is possible to mount the photodetector 73 without use of a bonding wire, and therefore, it is easy to assemble the component at a wafer stage, which makes it possible to provide the distance measuring head 70 suitable for mass production. However, the photodetector 73 may be a front side incident type, and in that case, it is recommended that wiring patterns and the electrodes of the photodetector 73 be connected by wire bonding.

Further, at the time of manufacturing the distance measuring head 70, it is preferable to fix the cap with lens 74 to the light transmissive optical component 60 at a wafer stage. In this case, for a reason which is the same as that in a fourth modified example which will be described later, it is possible to improve the accuracy of alignment between the cap with lens 74 and the light transmissive optical component 60.

Fourth Modified Example

In the above-described embodiment, the first plate-shaped member 10 having the light transmissive optical component 12 and the second plate-shaped member 20 having the light reflective optical components such as the fixed reflecting mirror 22 and the movable reflecting mirror 23 are joined together, thereby composing the interference optical system. Then, at the time of bonding the first plate-shaped member 10 and the second plate-shaped member 20, the alignment is performed by use of the alignment marks 17 of the first plate-shaped member 10 and the alignment marks 27 of the second plate-shaped member 20. In the present modified example, a method by which it is possible to further improve the accuracy of alignment more than the above-described embodiment will be described.

Figure 29:
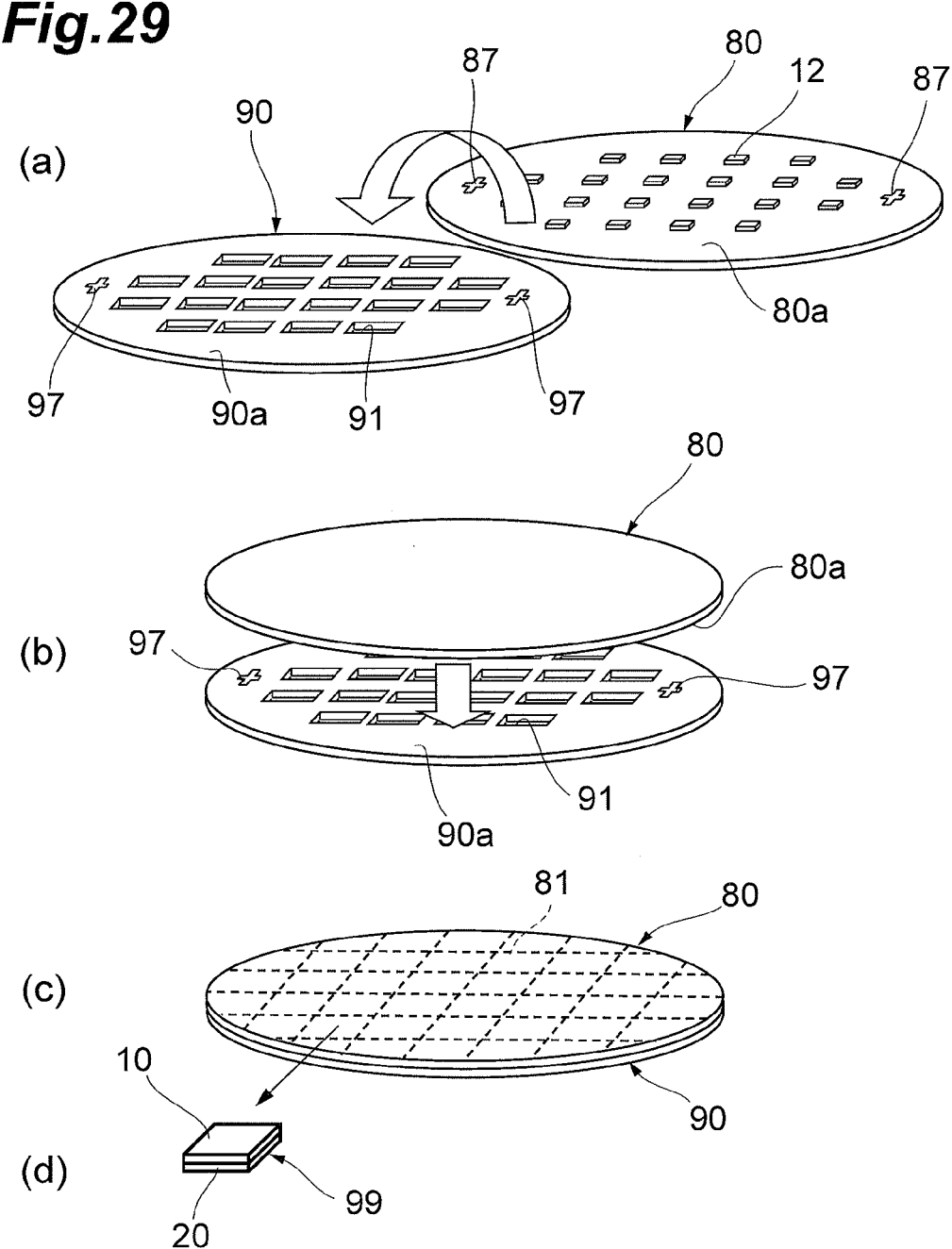
FIG. 29 includes diagrams for explanation of a manufacturing method according to a fourth modified example.

FIG. 29 includes diagrams for explanation of a manufacturing method according to the present modified example. In the above-described embodiment, the alignment marks 17 and 27 are formed on the peripheral portions 10c and 20c of the plate-shaped members 10 and 20, meanwhile, as shown in (a) in FIG. 29, alignment marks 87 and 97 may be formed on the respective peripheral portions of wafers 80 and 90 used for preparing the plurality of plate-shaped members 10 and 20. In addition, the wafer 80 shown in (a) in FIG. 29 includes a plurality of regions respectively having the light transmissive optical components 12 formed by applying etching to a silicon region. Further, the wafer 90 includes a plurality of regions 91 having the light reflective optical components (the incident mirror 21, the fixed reflecting mirror 22, the movable reflecting mirror 23, and the exit mirror 24) on the side of a principal surface 90a.

In the present modified example, first, as shown in (a) in FIG. 29, the plurality of alignment marks 87 and 97 for alignment of the wafers 80 and 90 are formed on the respective peripheral portions of the wafers 80 and 90. Then, as shown in (b) in FIG. 29, a component forming surface 80a of the wafer 80 on which the light transmissive optical components 12 are formed, and the principal surface 90a of the wafer 90 are made to face one another such that the positions of the plurality of alignment marks 87 and 97 are matched to one another. In this state, the wafers 80 and 90 are bonded to one another ((c) in FIG. 29). Thereafter, the bonded wafers are cut along predetermined cutting lines 81, to cut out regions corresponding to the plate-shaped members 10 and 20 ((d) in FIG. 29), thereby preparing optical modules 99.

Usually, in alignment between optical elements, rather than a parallel positional deviation between the optical elements, a relative angle deviation becomes a major issue. In the case where a beam is propagated between a plurality of optical elements, because parallel light is utilized in order not to widen a beam diameter, a parallel positional deviation between the optical elements does not become a major issue in many cases. Meanwhile, because a relative angle deviation causes a larger positional deviation as a distance between the optical elements gets longer, a beam comes off of the effective surfaces of the optical elements, which might lead to a lowering in light use efficiency.

In the present modified example, because the alignment marks 87 and 97 are formed on the peripheral portions of the wafers 80 and 90, it is possible to make the distance between the plurality of alignment marks very long. Accordingly, even in the case where the accuracy of bonding (for example, approximately 10 µm) in flip-chip bonding does not change, it is possible to prominently reduce a relative angle deviation between the first plate-shaped member 10 and the second plate-shaped member 20. For example, in the case where the alignment marks 87 and 97 are prepared respectively with a space of 130 mm by use of a 6-inch wafer, an angle deviation becomes $\tan^{-1}(0.02/130)=0.009°$, which is almost a negligible level.

The manufacturing method for an optical component and an optical component according to the present invention are not limited to the above-described embodiment and the respective modified examples, and various types of modifications are possible. For example, in the above-described embodiment and the respective modified examples, the one component of the Michelson interference optical system is exemplified as an optical component which is manufactured by the present invention, meanwhile, the present invention is applicable to, not only an interference optical system, but also various types of optical components having semi-transmissive reflecting surfaces.

A manufacturing method for an optical component according to the present embodiment is configured to include a first etching process of forming a depressed portion by applying etching to a silicon region of a plate-shaped member including the silicon region, a thermal oxidation process of forming a silicon oxide film by thermally oxidizing an inner side surface of the depressed portion, and a nitride film formation process of forming a silicon nitride film that covers the silicon oxide film.

Further, the manufacturing method for an optical component may be configured to further include an unnecessary portion removal process of removing an unnecessary portion of the silicon oxide film between the thermal oxidation process and the nitride film formation process. In the above-described manufacturing method, in the case where only a part of the inner side surface of the depressed portion is used as a semi-transmissive reflecting surface, the above-described manufacturing method further includes an unnecessary portion removal process, thereby it is possible to remove an unnecessary portion of the silicon oxide film, which makes it possible to prepare a desired optical component.

Further, the manufacturing method for an optical component may be configured to further include, before the first etching process, a mask formation process of sequentially forming a first mask having a pattern along a part of the inner side surface on the silicon region, and further forming second and third masks having an opening corresponding to a planar shape of the depressed portion on the silicon region and the first mask, and manufacturing method in which, in the first etching process, the third mask is removed after applying dry etching to the silicon region by use of the third mask, and in the thermal oxidation process, the second mask is removed after thermally oxidizing the inner side surface of the depressed portion by use of the second mask, and after the thermal oxidation process, the silicon region is etched by use of the first mask before the unnecessary portion removal process. Or, the manufacturing method for an optical component may be configured to further include, before the first etching process, a mask formation process of sequentially forming a first mask having a pattern along a part of the inner side surface on the silicon region, and further forming a second mask having an opening corresponding to a planar shape of the depressed portion on the silicon region and the first mask, and the manufacturing method in which, in the first etching process, wet etching is applied to the silicon region by use of the second mask, in the thermal oxidation process, the second mask is removed after thermally oxidizing the inner side surface of the depressed portion by use of the second mask, and after the thermal oxidation process, the silicon region is etched by use of the first mask before the unnecessary portion removal process. In accordance with any manufacturing method among these, it is possible to appropriately execute the first etching process and the thermal oxidation process which are mentioned above, and it is possible to form an optical component having a semi-transmissive reflecting surface into a desired shape.

Further, the manufacturing method for an optical component may be configured to form the silicon nitride film by use of a low pressure chemical vapor deposition method in the nitride film formation process. With this configuration, it is possible to uniformly form a silicon nitride film on the inner side surface which is largely inclined (or nearly vertical) with respect to the substrate surface.

Further, the manufacturing method for an optical component may be configured to form the inner side surface of the depressed portion along the thickness direction of the plate-shaped member in the first etching process. In accordance with the above-described manufacturing method, it is possible to uniformly form a silicon oxide film on the inner side surface which is nearly vertical to the board surface of the plate-shaped member in this way. In addition, in the above-described manufacturing method, in the first etching process, the inner side surface of the depressed portion may be formed along a direction inclined with respect to the thickness direction of the plate-shaped member by applying wet etching to the silicon region.

Further, an optical component according to the present embodiment is configured to include a silicon region which is included in a plate-shaped member, and whose one side surface is formed by etching, a silicon oxide film that covers the one side surface, and a silicon nitride film that covers the silicon oxide film, and the optical component in which the silicon oxide film is formed by thermally oxidizing an inner side surface of a depressed portion formed in the silicon region. In accordance with this optical component, it is possible to provide an optical component in which a silicon oxide film is uniformly formed on one side surface serving as a semi-transmissive reflecting surface which is largely inclined (or nearly vertical) with respect to a board surface of a plate-shaped member.

INDUSTRIAL APPLICABILITY

The present invention can be utilized as a manufacturing method for an optical component which is capable of uniformly forming a silicon oxide film on a semi-transmissive reflecting surface which is largely inclined (or nearly vertical) with respect to a substrate surface, and as an optical component manufactured by this method.

REFERENCE SIGNS LIST

10—first plate-shaped member, 10a—component forming surface, 10c—peripheral portion, 11—silicon region, 12—light transmissive optical component, 12a to 12d—side surface, 13—semi-transmissive reflection film, 14, 18—silicon oxide film, 16—silicon nitride film, 17, 27—alignment mark, 19—silicon nitride film, 20—second plate-shaped member, 20a—principal surface, 20c—peripheral portion, 21—incident mirror, 22—fixed reflecting mirror, 23—movable reflecting mirror, 24—exit mirror, 25—silicon layer, 26—metal film, 28—support substrate, 29—insulating layer, 30—electrostatic actuator, 51 to 54—light transmissive optical component, 60—light transmissive optical component, 61—silicon region, 62, 63—depressed portion, 64—metal film, 65—silicon oxide film, 66—silicon nitride film, 67—semi-transmissive reflection film, 68—wiring pattern, 70—distance measuring head, 71—surface emitting laser element, 72, 73—photodetector, 74—cap with lens, 80, 90—wafer, 87, 97—alignment mark, 99—optical module, $L_1$ to $L_3$—measurement object light, $L_4$—interfering light image.

The invention claimed is:

1. A manufacturing method for an optical component comprising:
   a first etching process of forming a depressed portion in a silicon region by applying etching to the silicon region of a plate-shaped member including the silicon region, the silicon region being composed of silicon;
   a thermal oxidation process of forming a silicon oxide film by thermally oxidizing an inner side surface of the depressed portion in the silicon region; and
   a nitride film formation process of forming a silicon nitride film that covers the silicon oxide film, wherein
   the manufacturing method further comprises:
   an unnecessary portion removal process of removing an unnecessary portion of the silicon oxide film between the thermal oxidation process and the nitride film formation process; and
   before the first etching process a mask formation process of sequentially forming a first mask having a pattern along a part of the inner side surface on the silicon region, and further forming second and third masks having an opening corresponding to a planar shape of the pressed portion on the silicon region and the first mask, wherein
   in the first etching process, the third mask is removed after applying dry etching to the silicon region by use of the third mask,
   in the thermal oxidation process, the second mask is removed after thermally oxidizing the inner side surface of the depressed portion by use of the second mask, and
   after the thermal oxidation process, the silicon region is etched by use of the first mask before the unnecessary portion removal process.

2. A manufacturing method for an optical component comprising:
   a first etching process of forming a depressed portion in a silicon region by applying etching to the silicon region of a plate-shaped member including the silicon region, the silicon region being composed of silicon;
   a thermal oxidation process of forming a silicon oxide film by thermally oxidizing an inner side surface of the depressed portion in the silicon region; and a nitride film formation process of forming a silicon nitride film that covers the silicon oxide film, wherein the manufacturing method further comprises:

an unnecessary portion removal process of removing an unnecessary portion of the silicon oxide film between the thermal oxidation process and the nitride film formation process; and before the first etching process, a mask formation process of sequentially forming a first mask having a pattern along a part of the inner side surface on the silicon region, and further forming a second mask having an opening corresponding to a planar shape of the depressed portion on the silicon region and the first mask, wherein in the first etching process, wet etching is applied to the silicon region by use of the second mask, in the thermal oxidation process, the second mask is removed after thermally oxidizing the inner side surface of the depressed portion by use of the second mask, and after the thermal oxidation process, the silicon region is etched by use of the first mask before the unnecessary portion removal process.

3. The manufacturing method for an optical component according to claim 1, wherein the silicon nitride film is formed by use of a low pressure chemical vapor deposition method in the nitride film formation process.

4. The manufacturing method for an optical component according to claim 1, wherein the inner side surface of the depressed portion is formed along the thickness direction of the plate-shaped member in the first etching process.

5. The manufacturing method for an optical component according to claim 1, wherein the inner side surface of the depressed portion is formed along a direction inclined with respect to the thickness direction of the plate-shaped member by applying wet etching to the silicon region in the first etching process.

6. The manufacturing method for an optical component according to claim 2, wherein the silicon nitride film is formed by use of a low pressure chemical vapor deposition method in the nitride film formation process.

7. The manufacturing method for an optical component according to claim 2, wherein the inner side surface of the depressed portion is formed along the thickness direction of the plate-shaped member in the first etching process.

8. The manufacturing method for an optical component according to claim 2, wherein the inner side surface of the depressed portion is formed along a direction inclined with respect to the thickness direction of the plate-shaped member by applying wet etching to the silicon region in the first etching process.

* * * * *